(12) United States Patent
Nicola et al.

(10) Patent No.: US 11,808,374 B2
(45) Date of Patent: Nov. 7, 2023

(54) FLUID MANAGEMENT SYSTEM

(71) Applicant: Leggett & Platt Canada Co., Halifax (CA)

(72) Inventors: Stefano Nicola, Windsor (CA); Maxime Samain, Harelbeke (BE); Daniel Schmitz, Altdorf (DE); Renato Colja, Windsor (CA); Robert J. McMillen, Tecumseh (CA)

(73) Assignee: Leggett & Platt Canada Co., Halifax (CA)

( * ) Notice: Subject to any disclaimer, the term of this patent is extended or adjusted under 35 U.S.C. 154(b) by 8 days.

(21) Appl. No.: 17/561,281

(22) Filed: Dec. 23, 2021

(65) Prior Publication Data
US 2022/0205551 A1    Jun. 30, 2022

Related U.S. Application Data

(60) Provisional application No. 63/132,113, filed on Dec. 30, 2020.

(51) Int. Cl.
*F16K 31/02* (2006.01)
*F16K 11/08* (2006.01)
*F16K 31/126* (2006.01)
*F16K 11/085* (2006.01)

(52) U.S. Cl.
CPC .......... *F16K 31/025* (2013.01); *F16K 11/085* (2013.01); *F16K 31/1264* (2013.01)

(58) Field of Classification Search
CPC .............................. F16K 11/085; F16K 31/025
See application file for complete search history.

(56) References Cited

U.S. PATENT DOCUMENTS

| 3,203,447 A | 8/1965 | Bremner et al. |
| 3,442,483 A | 5/1969 | Schwartz |
| 4,529,214 A | 7/1985 | Stoll et al. |
| 4,548,041 A | 10/1985 | Taylor |

(Continued)

FOREIGN PATENT DOCUMENTS

| CN | 2526615 Y | 12/2002 |
| CN | 103991396 A | 8/2014 |

(Continued)

OTHER PUBLICATIONS

G.Rau Innovative Metalle, "Thermal Actuators", 12 pages, retrieved Apr. 7, 2019.

*Primary Examiner* — Kevin R Barss
(74) *Attorney, Agent, or Firm* — Michael Best & Friedrich LLP

(57) ABSTRACT

A fluid management system includes a housing having a central manifold in fluid communication with a source of pressurized fluid, a plurality of first ports in communication with the central manifold, a plurality of second ports in communication with the environment surrounding the housing, and a plurality of third ports each configured to be coupled to a vessel for containing the pressurized fluid. The fluid management system also includes a plurality of valves and a plurality of actuators, each actuator including a smart material and associated with one of the plurality of valves. In response to activation by an energy source, each actuator is configured to move the associated valve to one of a first position or a second position.

20 Claims, 25 Drawing Sheets

(56) References Cited

U.S. PATENT DOCUMENTS

| | | | |
|---|---|---|---|
| 4,630,799 A | 12/1986 | Nolan et al. | |
| 4,674,398 A | 6/1987 | Taylor | |
| 4,903,732 A | 2/1990 | Allen | |
| 4,922,965 A | 5/1990 | Meister | |
| 4,973,024 A | 11/1990 | Homma | |
| 5,148,833 A | 9/1992 | Ota | |
| 5,211,371 A | 5/1993 | Coffee | |
| 6,098,000 A | 8/2000 | Long et al. | |
| 6,203,105 B1 | 3/2001 | Rhodes, Jr. | |
| 6,499,509 B2 | 12/2002 | Berger et al. | |
| 7,744,059 B2 | 6/2010 | Jerg | |
| 7,815,161 B2 | 10/2010 | Saitoh et al. | |
| 8,499,779 B2 | 8/2013 | Gillespie | |
| 8,629,745 B2 | 1/2014 | Sturman et al. | |
| 8,784,080 B2 | 7/2014 | Dorfler et al. | |
| 8,794,707 B2 | 8/2014 | Bocsanyi et al. | |
| 9,186,853 B2 | 11/2015 | Khan et al. | |
| 9,797,521 B1 | 10/2017 | Davis | |
| 9,945,490 B2 | 4/2018 | Dankbaar et al. | |
| 9,951,765 B2 | 4/2018 | Ki et al. | |
| 10,066,756 B2 | 9/2018 | Sohn | |
| 10,107,279 B2 | 10/2018 | Dankbaar et al. | |
| 10,107,410 B2 | 10/2018 | Dankbaar et al. | |
| 10,207,619 B2 | 2/2019 | Dankbaar et al. | |
| 10,290,876 B2 | 5/2019 | Prieto et al. | |
| 10,378,677 B2 | 8/2019 | Kuszneruk et al. | |
| 10,753,494 B2 | 8/2020 | Beuschel et al. | |
| 10,948,097 B2 | 5/2021 | Dorfler et al. | |
| 11,073,219 B2 | 7/2021 | Dorfler et al. | |
| 2002/0112788 A1 | 8/2002 | Tanaka et al. | |
| 2003/0178074 A1 | 9/2003 | Itzhaky | |
| 2005/0005980 A1 | 1/2005 | Eberhardt et al. | |
| 2005/0139610 A1 | 6/2005 | Crossdale et al. | |
| 2007/0023089 A1 | 2/2007 | Beyerlein et al. | |
| 2008/0271559 A1 | 11/2008 | Garscha et al. | |
| 2010/0139785 A1 | 6/2010 | Saitoh et al. | |
| 2011/0095216 A1* | 4/2011 | deGreef | F16K 27/003 251/129.15 |
| 2012/0067430 A1 | 3/2012 | Deperraz et al. | |
| 2012/0143108 A1 | 6/2012 | Bocsanyi et al. | |
| 2012/0153043 A1 | 6/2012 | Arekar et al. | |
| 2012/0199768 A1 | 8/2012 | Love et al. | |
| 2014/0103232 A1 | 4/2014 | Deperraz | |
| 2014/0232155 A1 | 8/2014 | Bocsanyi et al. | |
| 2015/0028234 A1 | 1/2015 | Kraus et al. | |
| 2016/0018016 A1* | 1/2016 | Dankbaar | F16K 7/12 251/129.01 |
| 2016/0153575 A1 | 6/2016 | Sohn | |
| 2016/0207075 A1* | 7/2016 | Alexander | B08B 3/02 |
| 2018/0023906 A1 | 1/2018 | Tajiri et al. | |
| 2018/0038514 A1 | 2/2018 | Kusneruk et al. | |
| 2018/0283571 A1* | 10/2018 | Miyazoe | F16K 31/0613 |
| 2018/0306212 A1* | 10/2018 | Weickel | F15B 13/0839 |
| 2018/0363642 A1* | 12/2018 | Salih | F04B 53/1027 |
| 2019/0003609 A1 | 1/2019 | Asai et al. | |
| 2019/0107214 A1* | 4/2019 | Kruppe | F16K 31/508 |
| 2019/0116681 A1* | 4/2019 | De Carolis | G05B 19/054 |
| 2019/0118690 A1 | 4/2019 | Beuschel et al. | |
| 2019/0120402 A1 | 4/2019 | Jamison et al. | |
| 2019/0195246 A1* | 6/2019 | Jamison | F15B 13/0828 |
| 2019/0353268 A1 | 11/2019 | Dorfler et al. | |
| 2019/0353270 A1 | 11/2019 | Dorfler et al. | |
| 2020/0088314 A1 | 3/2020 | Samain et al. | |
| 2020/0378516 A1 | 12/2020 | Beuschel et al. | |
| 2021/0018109 A1 | 1/2021 | Beuschel et al. | |
| 2022/0243827 A1* | 8/2022 | Nicola | F16K 11/044 |

FOREIGN PATENT DOCUMENTS

| | | |
|---|---|---|
| CN | 105465090 A | 4/2016 |
| CN | 108953683 A | 12/2018 |
| CN | 109318770 A | 2/2019 |
| DE | 19545011 A1 | 4/1997 |
| DE | 19718169 A1 | 11/1998 |
| DE | 10063478 A1 | 7/2002 |
| DE | 102005060217 A1 | 7/2006 |
| DE | 102006053147 A1 | 5/2007 |
| DE | 102011100327 B3 | 8/2012 |
| DE | 102013208820 A1 | 11/2014 |
| DE | 202014006875 U1 | 12/2014 |
| DE | 102015201534 B3 | 4/2016 |
| DE | 102014225756 A1 | 6/2016 |
| DE | 102016225519 A1 | 6/2018 |
| DE | 102017204662 B3 | 7/2018 |
| DE | 102017107073 A1 | 10/2018 |
| DE | 102017217213 B3 | 3/2019 |
| DE | 102018200635 A1 | 7/2019 |
| EP | 0423045 A1 | 4/1991 |
| EP | 1619287 A1 | 1/2006 |
| EP | 1909008 A1 | 4/2008 |
| EP | 1988440 A1 | 11/2008 |
| EP | 2078891 A2 | 7/2009 |
| EP | 2740521 A1 | 6/2014 |
| EP | 2860401 A2 | 4/2015 |
| EP | 3343078 A1 | 7/2018 |
| GB | 830393 A | 3/1960 |
| GB | 830394 A | 3/1960 |
| GB | 971816 A | 10/1964 |
| JP | 4091035 B2 | 5/2008 |
| WO | 2004104462 A1 | 12/2004 |
| WO | 2012159689 A1 | 11/2012 |
| WO | 2014135909 A1 | 9/2014 |
| WO | 2015185132 A | 12/2015 |
| WO | 2018005528 A1 | 1/2018 |
| WO | 2018049526 A1 | 3/2018 |
| WO | 2018065217 A1 | 4/2018 |
| WO | 2019149498 A1 | 8/2019 |

\* cited by examiner

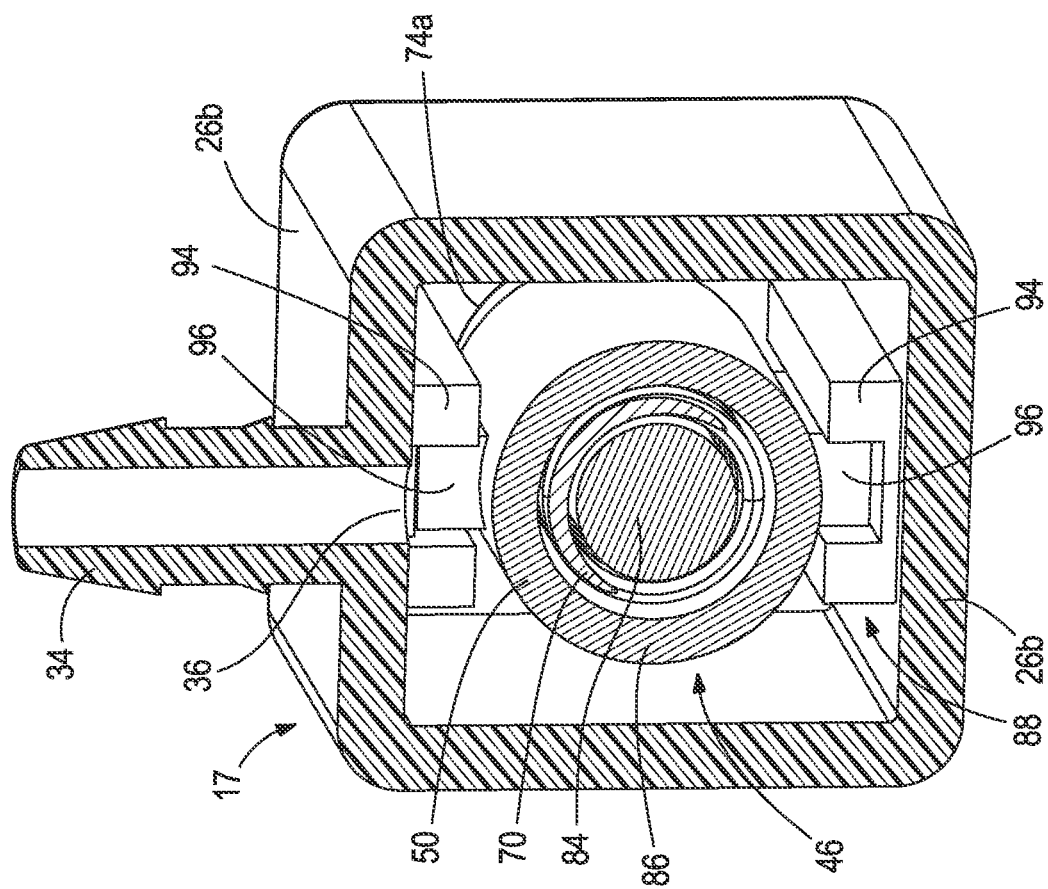
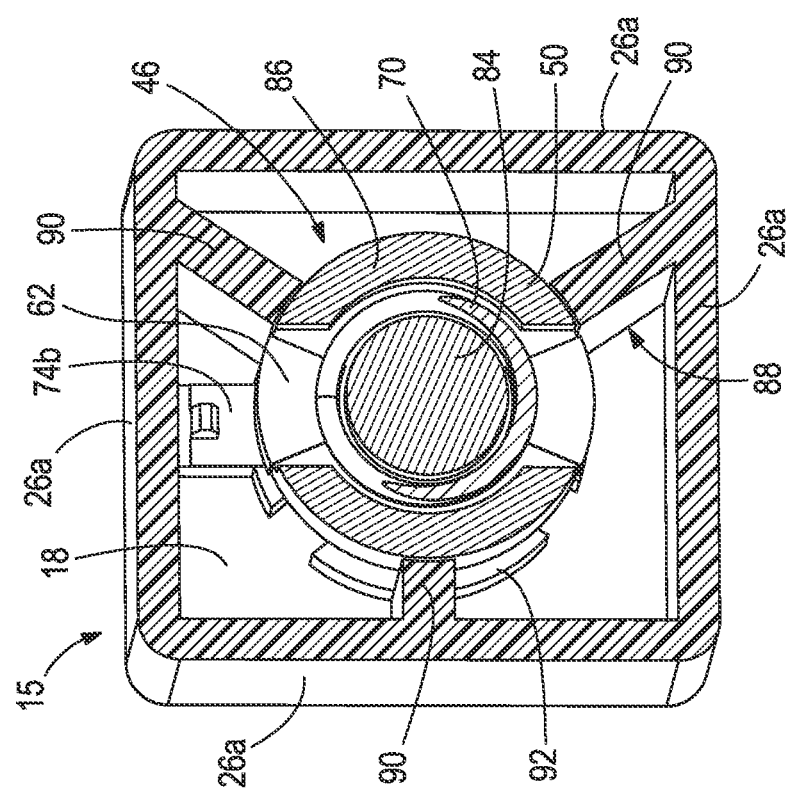

FLUID MANAGEMENT SYSTEM

CROSS-REFERENCE TO RELATED APPLICATIONS

This application claims priority to and the benefit of U.S. Provisional Patent Application No. 63/132,113, filed Dec. 30, 2020, the entire content of which is incorporated herein by reference.

BACKGROUND

The present disclosure relates to fluid management systems, and more particularly to fluid management systems that can be controlled through the use of smart materials, such as shape memory alloy materials.

In many industries including, but not limited to, comfort, aerospace, automotive, and furniture, there is a need for efficient ways to route air and other fluids for a variety of applications. Current solutions (e.g., valves) are often heavy, bulky and heavily customized for each specific application.

SUMMARY

The present disclosure provides a fluid management system.

For example, the present disclosure provides, in one aspect, a fluid management system including a housing having a central manifold in fluid communication with a source of pressurized fluid, a plurality of first ports in communication with the central manifold, a plurality of second ports in communication with the environment surrounding the housing, and a plurality of third ports each configured to be coupled to a vessel for containing the pressurized fluid. The fluid management system also includes a plurality of first valves each positioned and configured to close an associated one of the plurality of first ports in a first position and to permit fluid flow through the associated first port in the second position, a plurality of second valves each positioned and configured to close an associated one of the plurality of second ports in the first position and to permit fluid flow through the associated second port in the second position, a plurality of first actuators each including a smart material and each associated with one of the plurality of first valves, a plurality of second actuators each including a smart material and each associated with one of the plurality of second valves, and an energy source operatively associated with each of the first actuators and each of the second actuators. The energy source is configured to selectively operate each of the first actuators and each of the second actuators. In response to activation by the energy source, each first actuator is configured to move the associated first valve to one of the first position or the second position, and each second actuator is configured to move the associated second valve to one of the first position or the second position.

The present disclosure provides, in another aspect, a fluid management system including a housing having a manifold chamber in fluid communication with a source of pressurized fluid, wherein the manifold chamber is partially defined by a PCB, and a plurality of ports in fluid communication with the manifold chamber, wherein each port is configured to receive pressurized fluid from the manifold chamber. The fluid management system also includes a plurality of valves each positioned and configured to close an associated one of the plurality of ports in a first position and to permit pressurized fluid flow through the associated port in a second position. The PCB is positioned between the manifold chamber and the plurality of ports, includes a plurality of apertures, and each aperture is in fluid communication with the manifold chamber and in fluid communication with an associated one of the plurality of ports.

The present disclosure provides, in another aspect, a fluid management system including a housing having an interior volume defined by a first wall, a PCB spaced apart from and opposite the first wall, a pair of opposed spaced-apart second walls that extend between the first wall and the PCB, a manifold chamber in fluid communication with a source of pressurized fluid, wherein the manifold chamber is positioned within the interior volume, a plurality of first intake ports in fluid communication with the manifold chamber and positioned within the interior volume along a first side of the manifold chamber, a plurality of second intake ports in fluid communication with the manifold chamber and positioned within the interior volume along a second side of the manifold chamber opposite the first side, a plurality of first vent ports, each first vent port positioned within the interior volume and associated with one of the plurality of first intake ports and in fluid communication with a first vent chamber, a plurality of second vent ports, each second vent port positioned within the interior volume and associated with one of the plurality of second intake ports and in fluid communication with a second vent chamber, a plurality of first container ports each in fluid communication with a vessel for containing the pressurized fluid, each first container port in fluid communication with an associated one of the first plurality of intake ports and in fluid communication with an associated one of the first plurality of vent ports, and a plurality of second container ports each in fluid communication with a vessel for containing the pressurized fluid, each second container port in fluid communication with an associated one of the second plurality of intake ports and in fluid communication with an associated second one of the second plurality of vent ports. The fluid management system also includes a plurality of first intake valves, each first intake valve positioned and configured to close an associated one of the plurality of first intake ports in a first position and to permit pressurized fluid flow from the manifold through the associated first intake port in a second position, a plurality of second intake valves, each second intake valve positioned and configured to close an associated one of the plurality of second intake ports in a first position and to permit pressurized fluid flow from the manifold through the associated second intake port in a second position, a plurality of first vent valves, each first vent valve positioned and configured to close an associated one of the plurality of first vent ports in a first position and to permit fluid flow through the associated first vent port in a second position, and a plurality of second vent valves, each second vent valve positioned and configured to close an associated one of the second plurality of second vent ports in a first position and to permit fluid flow through the associated second vent port in a second position.

Other features and aspects of the disclosure will become apparent by consideration of the following detailed description and accompanying drawings.

BRIEF DESCRIPTION OF THE DRAWINGS

FIG. 2B is a cross-sectional view of the fluid management system of FIG. 1, taken along line 2B.

FIG. 2C is a cross-sectional view of the fluid management system of FIG. 1, taken along line 2C.

Before any embodiments of the disclosure are explained in detail, it is to be understood that the disclosure is not limited in its application to the details of construction, geometry, and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
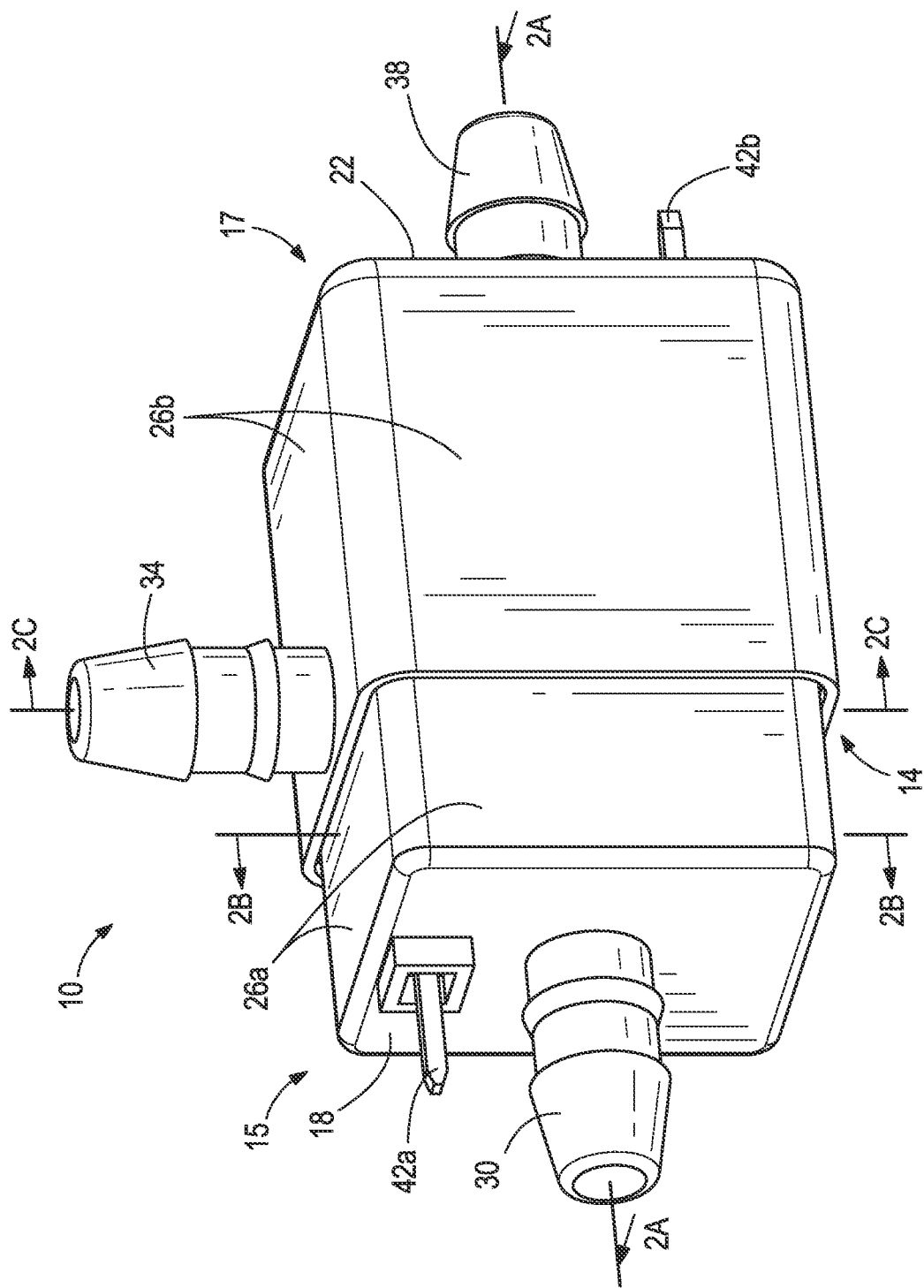
FIG. 1 is a perspective view of a fluid management system in accordance with an embodiment of the disclosure.

FIGS. 1-2C illustrate a fluid management system 10 according to an embodiment of the present disclosure. The system 10 includes a housing 14 with a first portion 15 and a second portion 17 coupled to the first portion 15 in a substantially air-tight manner. The first portion 15 has a first end wall 18 and a plurality of side walls 26a extending from the first end wall 18. The second portion 17 has a second end wall 22 opposite the first end wall 18 and a plurality of side walls 26b extending from the second end wall 22.

The housing 14 in the illustrated embodiment is substantially rigid and may be made of one or more plastic materials (e.g., polyethylene, polypropylene, ABS, or the like) via a molding process or any other suitable process. In some embodiments, the first portion 15 and/or the second portion 17 may be interchangeable with other housing components to provide the housing 14 with different sizes, shapes, or other configurations. For example, in some embodiments, one or more mounting features (e.g., hooks, bosses, bores, tabs, clips, or the like) may be provided on one or both of the portions 15, 17. One or both of the portions 15, 17 may be interchanged with other housing portions having different mounting features to provide the housing 14 with a desirable configuration for a particular application.

Figure 2A:
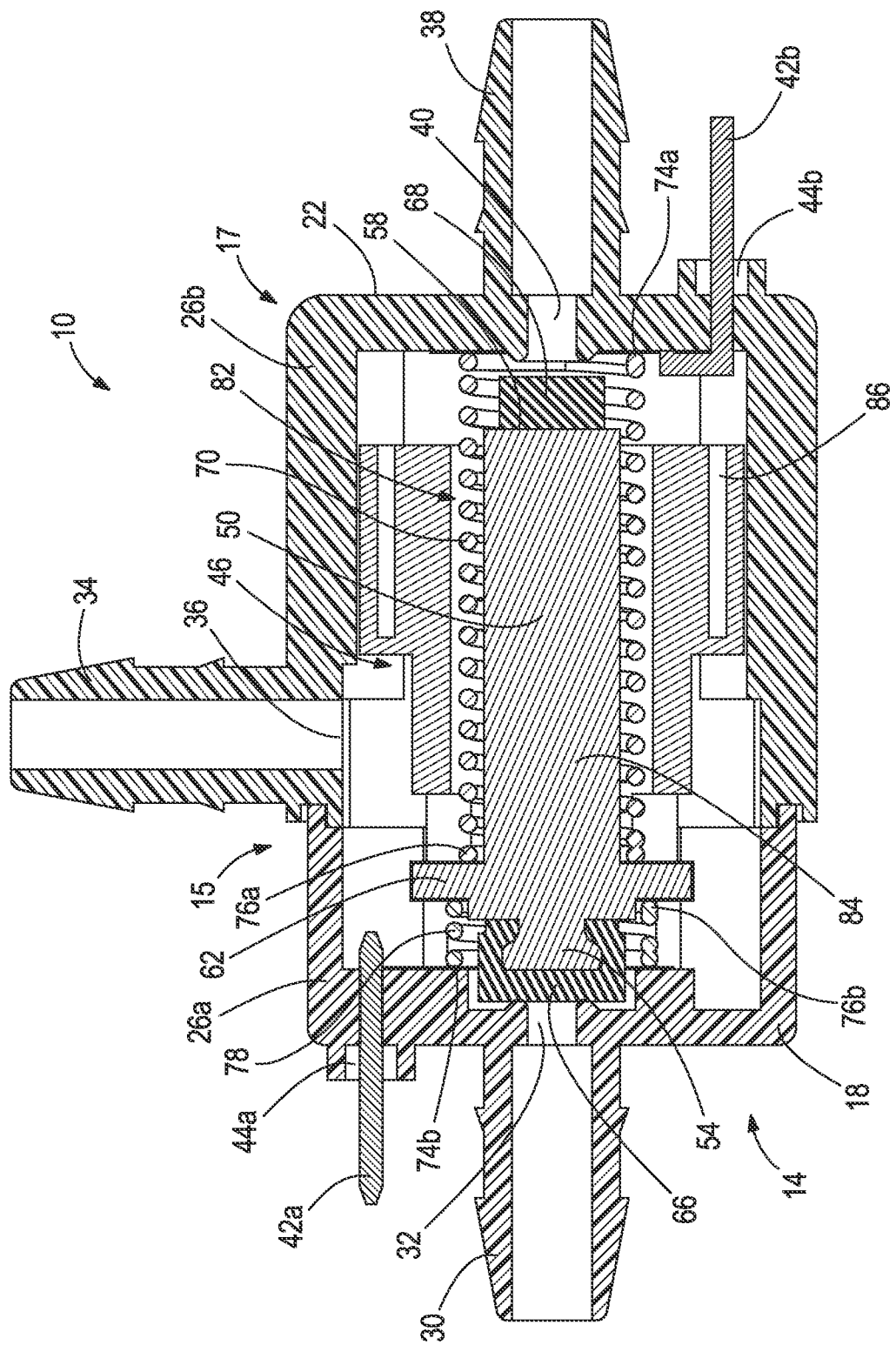
FIG. 2A is a cross-sectional view of the fluid management system of FIG. 1, taken along line 2A.

Referring to FIG. 2A, the illustrated system 10 includes a first port or pressure port 30 that communicates with an interior of the housing 14 via a pressure port opening 32, a second port or bladder port 34 that communicates with the interior of the housing 14 via a bladder port opening 36, and a third port or vent port 38 that communicates with the interior of the housing 14 via a vent port opening 40. In addition, a pair of electrodes 42a, 42b extends from the housing 14 through electrode openings 44a, 44b. In the illustrated embodiment, the pressure port 30 is integrally formed (e.g., molded) as a part of the first portion 15 of the housing 14, and the bladder port 34 and vent port 38 are integrally formed as a part of the second portion 17 of the housing 14. The housing portions 15, 17 may be molded around the respective electrodes 42a, 42b, which in some embodiments, may form a substantially fluid-tight seal between the electrodes 42a, 42b and the respective electrode openings 44a, 44b. In other embodiments, the electrodes 42a, 42b may be inserted through the openings 44a, 44b after the housing 14 is formed.

With reference to FIGS. 1-2A, in the illustrated embodiment, the pressure port 30 and the electrode 42a extend from the first end wall 18, the vent port 38 and the electrode 42b extend from the second end wall 22, and the bladder port 34 extends from one of the side walls 26b. As such, the pressure port 30 and the vent port 38, as well as the respective electrodes 42a, 42b, extend from the housing 14 in opposite directions. The bladder port 34 extends from the housing 14 generally transverse to the pressure and vent ports 30, 38. The illustrated construction may advantageously provide greater access to each of the ports 30, 34, 38 and electrodes 42a, 42b to facilitate making connections with fluid lines and electrical lines while minimizing the overall size of the housing 14. In other embodiments, the relative positions of the ports 30, 34, 38 and/or the electrodes 42a, 42b may vary.

In the illustrated embodiment, the pressure port 30, the bladder port 34, and the vent port 38 include barb fittings; however the ports 30, 34, 38 may include any other type of fittings (e.g., banjo fittings, threaded fittings, etc.) to suit a particular application. The pressure port 30 may be coupled to a source of pressurized fluid (e.g., air), the bladder port 34 may be coupled to a vessel for containing the pressurized air (e.g., an inflatable bladder; not shown) or to a downstream valve assembly or fluidic switching module configured to route the pressurized air to one or more such vessels, and the vent port 38 may be coupled to a location having lower or ambient pressure, such as an exhaust manifold. Alternatively, the vent port 38 may be in direct fluid communication with the environment surrounding the system 10. In other embodiments, the ports could be configured differently (e.g., the first port 30 could be the vent port, and the third port 38 could be the pressure port, etc.).

Referring to FIG. 2A, an actuator assembly 46 is contained within the housing 14. The actuator assembly 46 includes a valve body or piston 50 with a first end 54, a second end 58, and an annular flange 62. A pressure port seal element 66 is coupled to the first end 54 of the piston 50 and a vent port seal element 68 is coupled to the second end 58 of the piston 50. In the illustrated embodiment, a first spring 70 extends between and is electrically coupled to a conductive plate 74a disposed on the inner surface of the second end wall 22 and a conductive plating 76a disposed on the annular flange 62. An actuator in the form of a second spring 78 extends between and is electrically coupled to a conductive plate 74b disposed on the inner surface of the first end wall 18 and a conductive plating 76b disposed on the annular flange 62.

In the illustrated embodiment, the first spring 70 is a coil compression spring made of an electrically-conductive metal (e.g., spring steel), and the second spring 78 is a coil spring made of a smart material. As used herein, the term "smart material" means a material having one or more properties that can be controlled in a reversible manner by applying a stimulus, such as light, electrical current, a magnetic field, or a change in temperature. The stimulus is generated by a controllable energy source, such as an electrical voltage or current source, a light emitter (e.g., an LED), an electromagnet, or the like. The term smart material encompasses, but is not limited to, the following materials: shape memory alloy materials (including both binary and non-binary alloys having additional alloying elements such as hafnium, copper, or the like), liquid crystal elastomers, piezo electric polymers, and shape memory alloy polymers.

In some embodiments, the second spring 78 is made of a smart material in the form of a shape memory alloy material. The shape memory alloy material has temperature-dependent shape memory based on a fully reversible martensite to austenite transformation. That is, the shape memory alloy material has one shape or dimension associated with a martensitic crystalline structure at low temperature and another shape or dimension associated with an austenitic crystalline structure at high temperature. The transformation is reversible, such that the shape and/or size of the second spring 78 can be selectively varied.

In the illustrated embodiment, the second spring 78 is made of a binary Nickel-Titanium alloy. Alternatively, a Nickel-Titanium alloy system with one or more other elements, such as chromium, cobalt, copper, iron, hafnium, niobium, or others may be used. In yet other embodiments, the second spring 78 may be made from any other alloy with temperature-dependent shape memory. In addition, the second spring 78 may be made from a monolithic piece of the shape memory alloy material, which may simplify manufacturing of the second spring 78 and reduce the cost of the fluid management system 10. The first spring 70 in the illustrated embodiment does not have a temperature-dependent shape memory, but the first spring 70 may additionally or alternatively be made of a smart material such as a shape memory alloy material in other embodiments. In some embodiments, the second spring 78 may be made of spring steel and the first spring 70 may be made of the shape memory alloy material, or an alternative smart material in other embodiments.

With continued reference to FIG. 2A, the electrodes 42a, 42b extending from the housing 14 are electrically coupled to respective conductive plates 74a, 74b. The ends of the electrodes 42a, 42b extending from the housing 14 are configured to be electrically coupled to a power source (not shown) such that the power source, the electrodes 42a, 42b, the conductive plates 74a, 74b, the second spring 78, the conductive platings 76a, 76b, and the first spring 70, form an electric circuit 82.

The piston 50 is movable between a first or inflating position and a second or deflating position to selectively inflate or deflate the vessel coupled to the bladder port 34. In the deflating position, the pressure port seal element 66 engages and seals the pressure port opening 32, while the vent port seal element 68 is spaced from the vent port opening 40 to permit fluid flow through the vent port opening 40. As such, pressurized air is prevented from entering the interior of the housing 14 through the pressure port opening 32, and the interior of the housing 14 fluidly communicates with the ambient environment through the vent port opening 40. This allows the vessel coupled to the bladder port 34 to deflate. In the inflating position, the vent port seal element 68 engages and seals the vent port opening 40, while the pressure port seal element 66 is spaced from the pressure port opening 32 to permit fluid flow through the pressure port opening 32. As such, the interior of the housing 14 fluidly communicates with the source of pressurized air to pressurize the interior of the housing 14 and thereby inflate the vessel coupled to the bladder port 34.

Referring to FIGS. 2A-C, in the illustrated embodiment, the piston 50 includes a core 84 and a collar 86 at least partially surrounding the core 84. The collar 86 and the core 84 may be integrally formed together as a single piece, joined together at the annular flange 62. The collar 86 extends along the core 84 to define an annular space between the collar 86 and the core 84 that receives the first spring 70. The collar 86 and the core 84 may thus act as spring guides for the first spring 70.

Referring to FIGS. 2B-2C, the housing 14 may include internal support features 88 that support the actuator assembly 46 and/or guide movement of the piston 50. For example, in the illustrated embodiment, the first portion 15 of the housing 14 includes a plurality of support walls 90 extending inwardly from the side walls 26a (FIG. 2B). The support walls 90 may be in sliding contact with the outside of the collar 86 and/or the flange 62 of the piston 50 to at least partially support and guide movement of the piston 50 as it moves between the first and second positions. In the illustrated embodiment, the first portion 15 of the housing 14 includes three support walls 90, each spaced about the circumference of the collar 86 and separated by about 120 degrees. The support walls 90 thus may provide three points of contact with the collar 86 and/or the flange 62. In other embodiments, a different number/arrangement of support walls 90 may be provided.

Referring to FIG. 2C, the second housing portion 17 includes pairs of internal guide rails 94 that define channels therebetween. Projections 96 on the piston 50, and more specifically on the collar 86 of the piston 50, are slidably received within the channels between the guide rails 94. The engagement between the guide rails 94 and the projections 96 may thus at least partially support and guide movement of the piston 50 as it moves between the first and second positions. The piston 50 includes two projections 96 in the illustrated embodiment; however, other numbers and arrangements of projections 96 and/or guide rails 94 may be provided.

In addition to supporting/guiding the piston 50, the internal support features 88 of the housing 14 may also support the conductive plates 74a, 74b. For example, the first housing portion 15 in the illustrated embodiment includes arcuate wall segments 92 extending inwardly from the first end wall 18. The wall segments 92 may both axially and radially support the conductive plate 74b to absorb the spring force exerted on the conductive plate 74b by the first and second springs 70, 78. Although not illustrated in FIG. 2C, the second housing portion 17 may include similar structures to support the conductive plate 74b.

The internal support features 88 may advantageously be integrally formed together with the respective housing portions 15, 17 (e.g., during molding of the housing portions 15, 17). The support features 88 may facilitate assembly of the fluid management system 10 by guiding insertion of the actuator assembly 46 into the housing 14 and ensuring proper placement of the actuator assembly 46 within the housing 14.

In some embodiments, the actuator assembly 46 may be installed into the second housing portion 17 during assembly, with the internal support features 88 guiding installation of the actuator assembly 46 into the second housing portion 17. Then, the first housing portion 15 may be moved toward and coupled to the second housing portion 17 to enclose the actuator assembly 46 within the housing 14. The internal support features 88 may facilitate aligning the first housing portion 15 with the actuator assembly 46. As the first housing portion 15 is moved toward the second housing portion 17, the springs 70, 78 may be compressed between the ends 18, 22 of the housing 14 to provide a desired pre-load.

In operation, to inflate the vessel, the pressurized air source supplies pressurized air to the pressurized air port 30 of the system 10, and the power source is energized. The power source drives current through the electric circuit 82, such that current flows from the power source through the second spring 78. As a result of the applied current, the second spring 78 is heated.

In the illustrated embodiment, the piston 50 is biased toward the deflating position. Specifically, the first spring 70 pushes against the annular flange 62 to hold the piston 50 in the deflating position so that the pressure port seal element 66 is held against the pressure port opening 32. When the second spring 78 is heated, the shape memory alloy material changes from a martensitic structure to an austenitic structure and expands in an axial direction. Because the second spring 78 is rigidly coupled to the first end wall 18, the second spring 78 expands away from the first end wall 18 and pushes the annular flange 62 toward the second end wall 22 against the biasing force of the first spring 70. The second spring 78 pushes the piston 50 with sufficient force to move the piston 50 to the inflating position, and pressurized air is allowed to enter the interior of the housing 14.

In the inflating position, the pressurized air entering the interior of the housing 14 is prevented from exiting the interior of the housing 14 through the vent port opening 40. Because the vent port opening 40 is sealed, pressure may build within the housing 14 to cause air to flow through the bladder port 34 and into the vessel, thereby inflating the vessel.

To return the piston 50 to the deflating position, the power source is deenergized to cease driving current through the electric circuit 82. Without current flowing through the second spring 78, the second spring 78 cools, and the shape memory alloy material changes back from an austenitic structure to a martensitic structure. The second spring 78 thus contracts, and the compressed spring 70 restores itself, expanding away from the second end wall 22 to push against the annular flange 62 and move the piston 50 to the deflating position. With the pressure port opening 32 sealed and the vent port opening 40 now open, the pressurized air contained in the vessel flows from the vessel through the interior of the housing 14 and exits through the vent port opening 40. Therefore, pressurized air contained in the vessel exits the vessel so that the vessel deflates.

Figure 3:
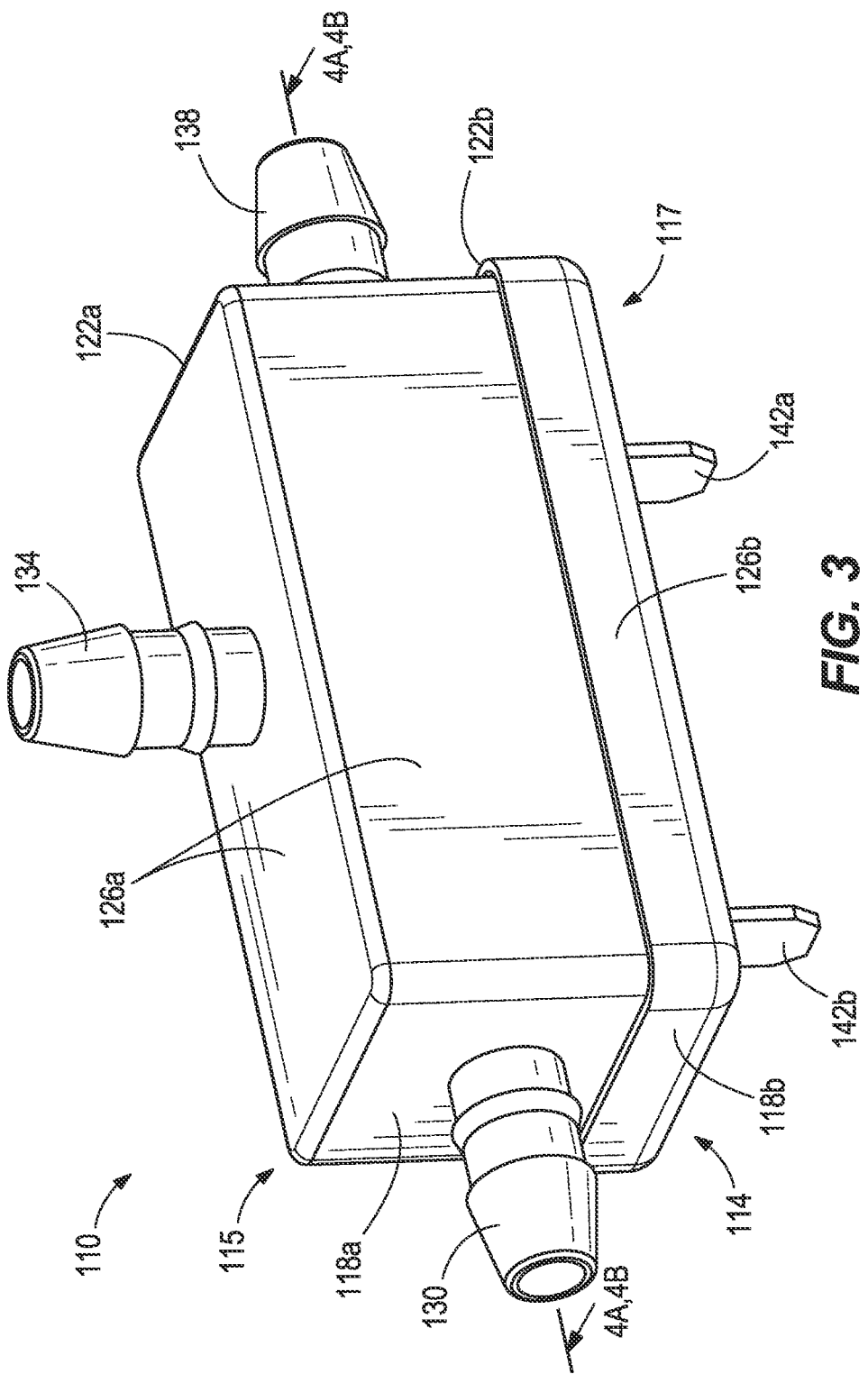
FIG. 3 is a perspective view of a fluid management system in accordance with another embodiment of the disclosure.
Figure 4A:
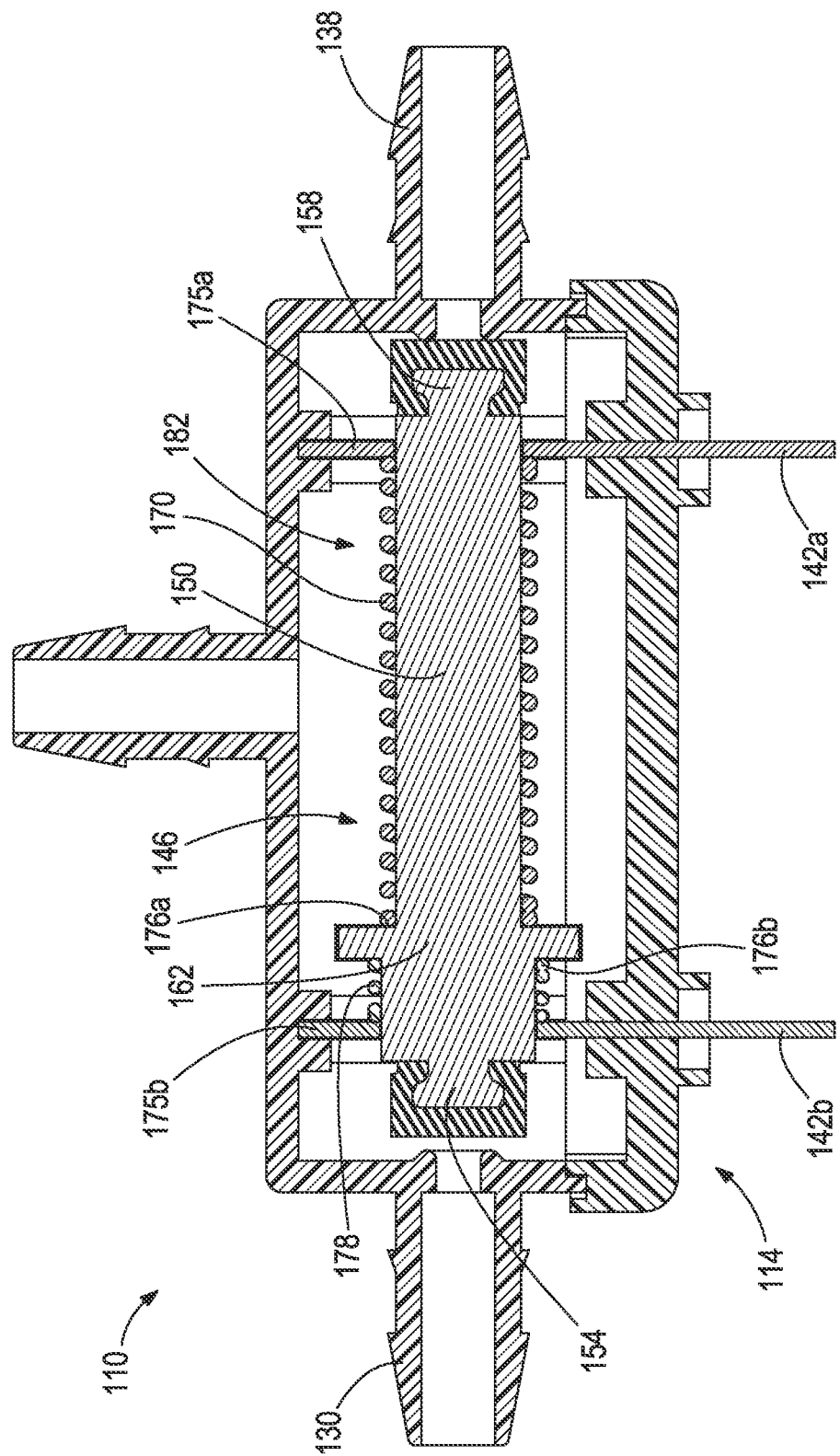
FIG. 4A is a cross-sectional view of the fluid management system of FIG. 3, taken along line 4A.
Figure 4B:
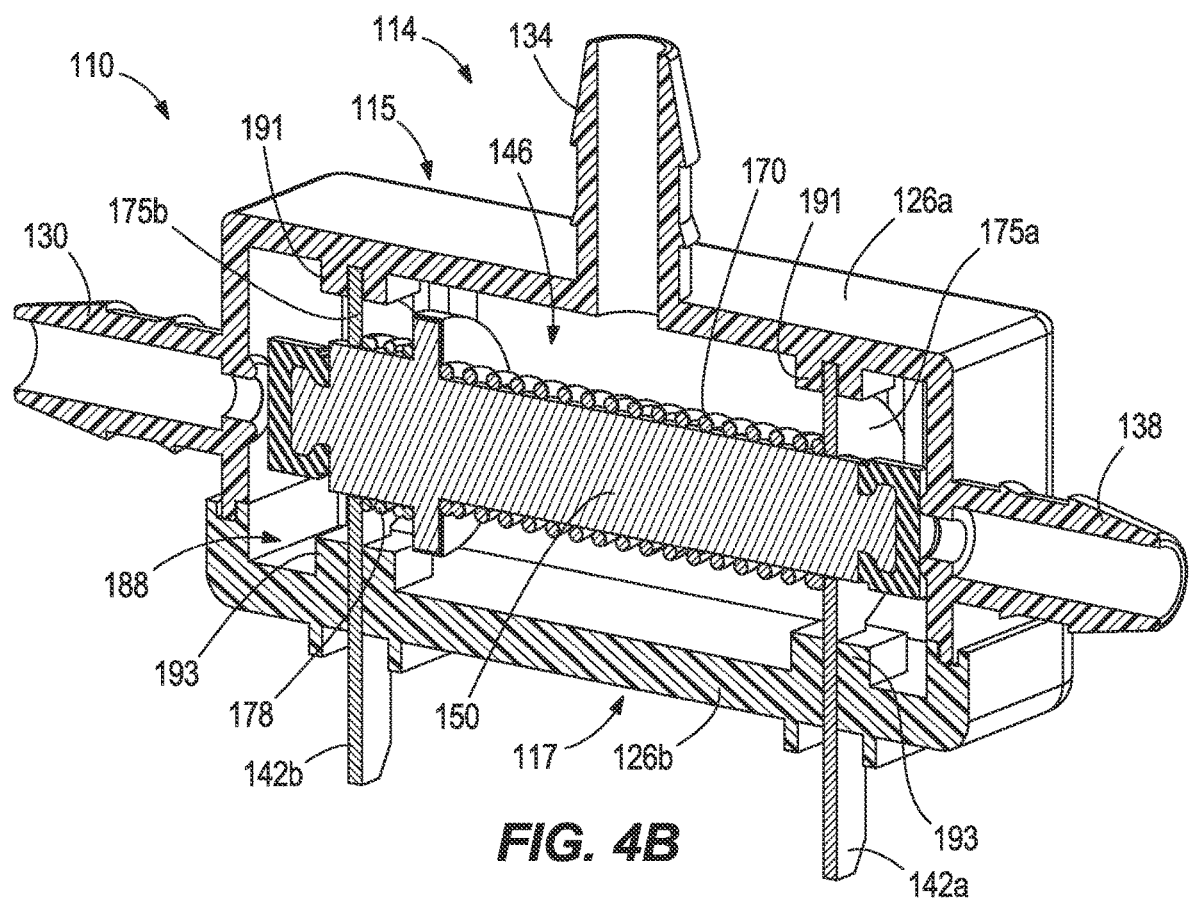
FIG. 4B is a cross-sectional view of the fluid management system of FIG. 3, taken along line 4B.

FIGS. 3-4B illustrate a fluid management system 110 according to another embodiment. The illustrated fluid management system 110 is similar to the system 10 described above with reference to FIGS. 1-2C. The features and elements of the system 110 corresponding with features and elements of the system 10 are given corresponding reference numbers plus '100.' In addition, the following description focuses primarily on differences between the system 110 and the system 10. It should be understood that features and elements of the system 10 may be incorporated into the system 110, and vice versa.

Referring to FIGS. 3 and 4A, the fluid management system 110 includes a housing 114 with a first portion 115 and a second portion 117 coupled to the first portion 115 in a substantially air-tight manner. The first portion 115 has a first end wall 118a, a second end wall 122a, and a plurality of side walls 126a extending between the first end wall 118a and the second end wall 122a, while the second portion 117 has a first end wall 118b, a second end wall 122b, and a plurality of side walls 126b extending between the first end wall 118b and the second end wall 122b. In this embodiment, a pressure port 130 extends from the first end wall 118a, a vent port 138 extends from the second end wall 122a, a bladder port 134 extends from one of the plurality of side walls 126a, and electrodes 142a, 142b extend from one of the plurality of side walls 126b. The electrodes 142a, 142b extend from the same side wall 126b opposite the bladder port 134 in the illustrated embodiment, which may facilitate placement of the fluid management system 110 in small spaces.

With reference to FIG. 4A, an actuator assembly 146 is contained within the housing 114. The actuator assembly 146 includes a valve body or piston 150 with a first end 154, a second end 158, and an annular flange 162. In this illustrated embodiment, a first spring 170 extends between and is electrically coupled to a conductive flange 175a arranged concentrically around the piston 150 and a conductive plating 176a disposed on the annular flange 162. An actuator in the form of a second spring 178 extends between and is electrically coupled to a conductive flange 175b arranged concentrically around the piston 150 and a conductive plating 176b disposed on the annular flange 162. In the illustrated embodiment, the conductive flanges 175a, 175b are spaced from the end walls 118a, 118b, 122a, 122b of the housing 114.

With continued reference to FIG. 4A, the electrodes 142a, 142b are electrically coupled to respective conductive flanges 175a, 175b, and in the illustrated embodiment, the electrodes 142a, 142b are integrally formed with the flanges 175a, 175b. The ends of the electrodes 142a, 142b extending from the housing 114 are configured to be electrically coupled to a power source such that the power source, the electrodes 142a, 142b, the conductive flanges 175a, 175b, the second spring 178, the conductive platings 176a, 176b, and the first spring 170 form an electric circuit 182.

Referring to FIG. 4B, the housing 114 may include internal support features 188 that support the actuator assembly 146 and/or guide movement of the piston 150. For example, in the illustrated embodiment, the first portion 115 of the housing 114 includes a plurality of support walls 191 extending inwardly from the side walls 126a, and the second portion 117 of the housing 114 includes a plurality of support walls 193 extending inwardly from the side walls 126b. The support walls 191, 193 are provided in pairs that define slots therebetween to receive portions of the conductive flanges 175a, 175b. As such, the walls 191, 193 may support the flanges 175a, 175b to absorb the forces of the springs 170, 178.

The internal support features 188 may advantageously be integrally formed together with the respective housing portions 115, 117 (e.g., during molding of the housing portions 115, 117). The support features 188 may facilitate assembly of the fluid management system 110 by guiding insertion of the flanges 175a, 175b and electrodes 142a, 142b into the housing 114 and thereby ensuring proper placement of the actuator assembly 146 within the housing 114 and proper pre-loading of the springs 170, 178.

Like the first spring 70 and second spring 78 described above with reference to FIGS. 1 and 2, the first spring 170 is a compression coil spring made of metal such as spring steel, and the second spring 178 is a coil spring made of a smart material, and more particularly, a shape memory alloy material in the illustrated embodiment. The fluid management system 110 illustrated in FIGS. 3-4B operates in much the same way as the fluid management system 10 described above with reference to FIGS. 1 and 2. The piston 150 is movable between a first or inflating position and a second or deflating position to selectively inflate or deflate a vessel coupled to the bladder port 134.

To inflate the vessel, the pressurized air source supplies pressurized air to the pressurized air port 130 of the system 110, and the power source is energized. The power source drives current through the electric circuit 182, such that current flows from the power source through the second spring 178. This heats the second spring 178, which then expands away from the conductive flange 175b and pushes against the annular flange 162 to move the piston 150 toward the second end walls 122a, 122b against the biasing force of the first spring 170. The second spring 178 pushes the piston 150 with sufficient force to move the piston 150 to the inflating position.

To deflate the vessel, the power source is deenergized to cease driving current through the electric circuit 182 such that current no longer flows from the power source through the second spring 178. Without current flowing through the second spring 178, the second spring 178 cools and contracts. The first spring 170 restores itself, expanding away from the conductive flange 175a to push against the annular flange 162 and move the piston 150 to the deflating position.

Figure 5:
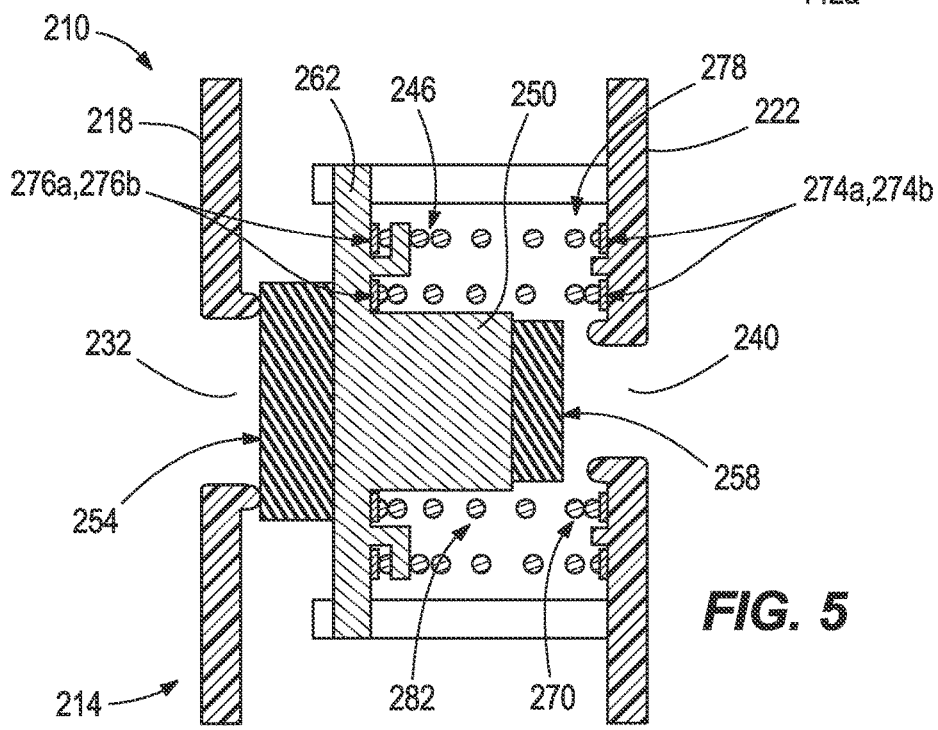
FIG. 5 is a cross-sectional view of a fluid management system in accordance with another embodiment of the disclosure.

FIG. 5 illustrates a fluid management system 210 according to another embodiment. The illustrated fluid management system 210 is similar to the fluid management system 10 described above with reference to FIGS. 1-2C. Features and elements of the system 210 corresponding with features and elements of the system 10 are given corresponding reference numbers plus '200.' In addition, the following description focuses primarily on differences between the system 210 and the system 10. It should be understood that features and elements of the system 10 may be incorporated into the system 210, and vice versa.

Referring to FIG. 5, the fluid management system 210 includes a housing 214. The housing 214 has a first end wall 218, a second end wall 222, and a plurality of side walls (not shown) extending between the first end wall 218 and the second end wall 222. In this embodiment, a pressure port opening 232 is disposed in the first end wall 218, a vent port opening 240 is disposed in the second end wall 222, and a bladder port opening (not shown) is disposed in one of the plurality of side walls.

With continued reference to FIG. 5, an actuator assembly 246 is contained within the housing 214. The actuator assembly 246 includes a valve body or piston 250 with a first end 254, a second end 258, and an annular flange 262. In the illustrated embodiment, a first spring 270 extends between and is electrically coupled to a conductive plate 274a disposed on the second end wall 222 of the housing 214 and a conductive plating 276a disposed on the annular flange 262. The first spring 270 is configured as a compression spring made of spring steel. An actuator in the form of a second spring 278 extends between and is electrically coupled to a conductive plate 274b disposed on the second end wall 222 of the housing 214 and a conductive plating 276b disposed on the annular flange 262. The second spring 278 is made of a smart material, and more particularly, a shape memory alloy material in the illustrated embodiment. The illustrated second spring 278 is arranged concentrically around the first spring 270. Alternatively, the second spring 278 may be arranged concentrically within the first spring 270. In some embodiments, the second spring 278 and the first spring 270 may not be concentrically arranged.

With continued reference to FIG. 5, the conductive plates 274a, 274b are in electrical communication with a power source such that the power source, the conductive plates 274a, 274b, the second spring 278, the conductive platings 276a, 276b, and the first spring 270 form an electric circuit 282. The fluid management system 210 illustrated in FIG. 5 operates in a similar manner as the fluid management system 10 described above with reference to FIGS. 1 and 2. That is, to inflate or deflate the vessel, the piston 250 is movable between an inflating position and a deflating position in response to selective energization of the power source.

To move the piston 250 into an inflating position, the power source is energized to drive current through the electric circuit 282 such that current flows from the power source through the second spring 278. This heats the second spring 278, which then contracts towards the second end wall 222 and pulls the annular flange 262 to move the piston 250 towards the second end wall 222 against the biasing force of the first spring 270. Pressurized air provided by the air source at the port opening 232 of the system 210 enters the housing 214 and exits through the bladder port opening to inflate the vessel.

To move the piston 250 into a deflating position, the power source is de-energized to cease driving current through the electric circuit 282. The second spring 278 cools and the first spring 270 restores itself, expanding away from the second end wall 222 to push the annular flange 262 and move the piston 250 into the deflating position. Pressurized air provided by the air source at the port opening 232 of the system 210 is prevented from entering the housing 214, and the pressurized air held in the vessel exits the vessel through the housing 214 and out the vent port opening 240 to deflate the vessel.

In alternative embodiments, the first spring 270 may be configured as a tension spring rather than a compression spring, and the second spring 278 may be configured to expand rather than contract when the power source drives current through the electric circuit 282.

Figure 7:
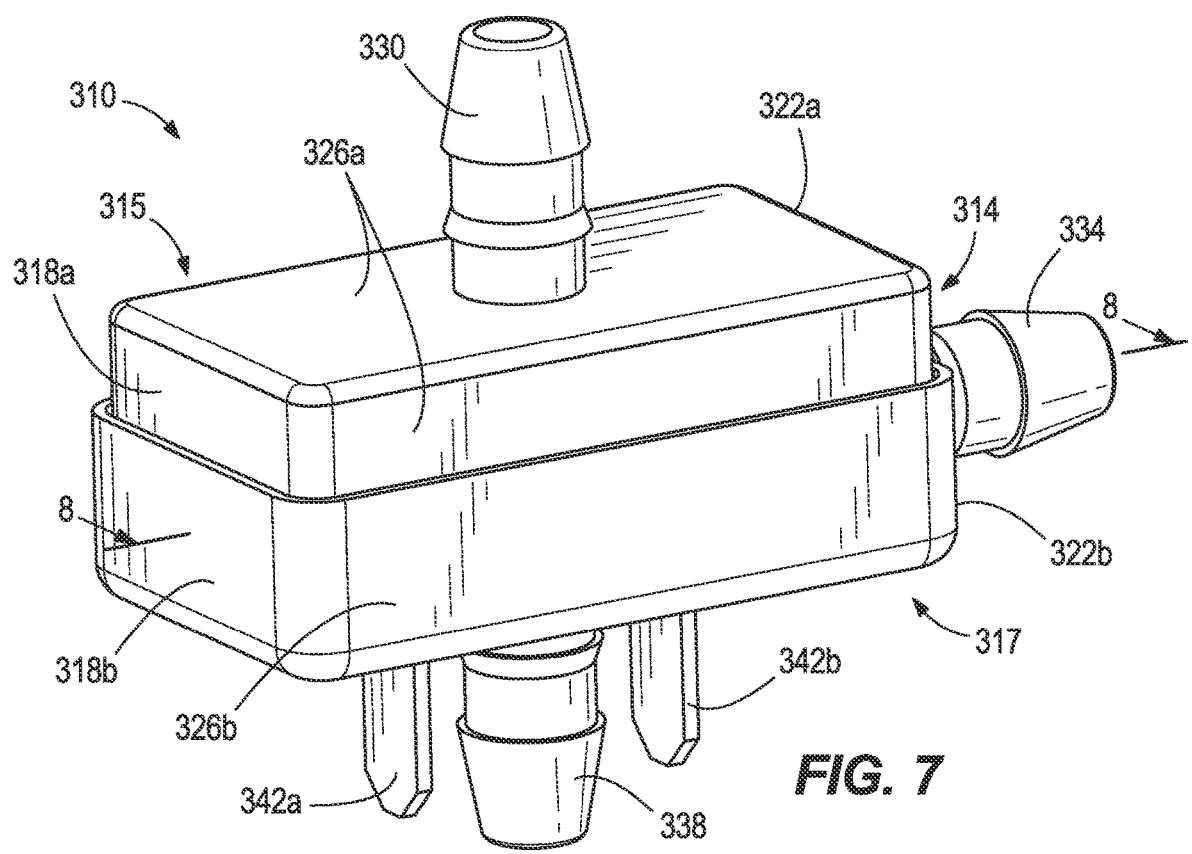
FIG. 7 is a perspective view of a fluid management system in accordance with another embodiment of the disclosure, incorporating the smart material actuator of FIG. 6.
Figure 8:
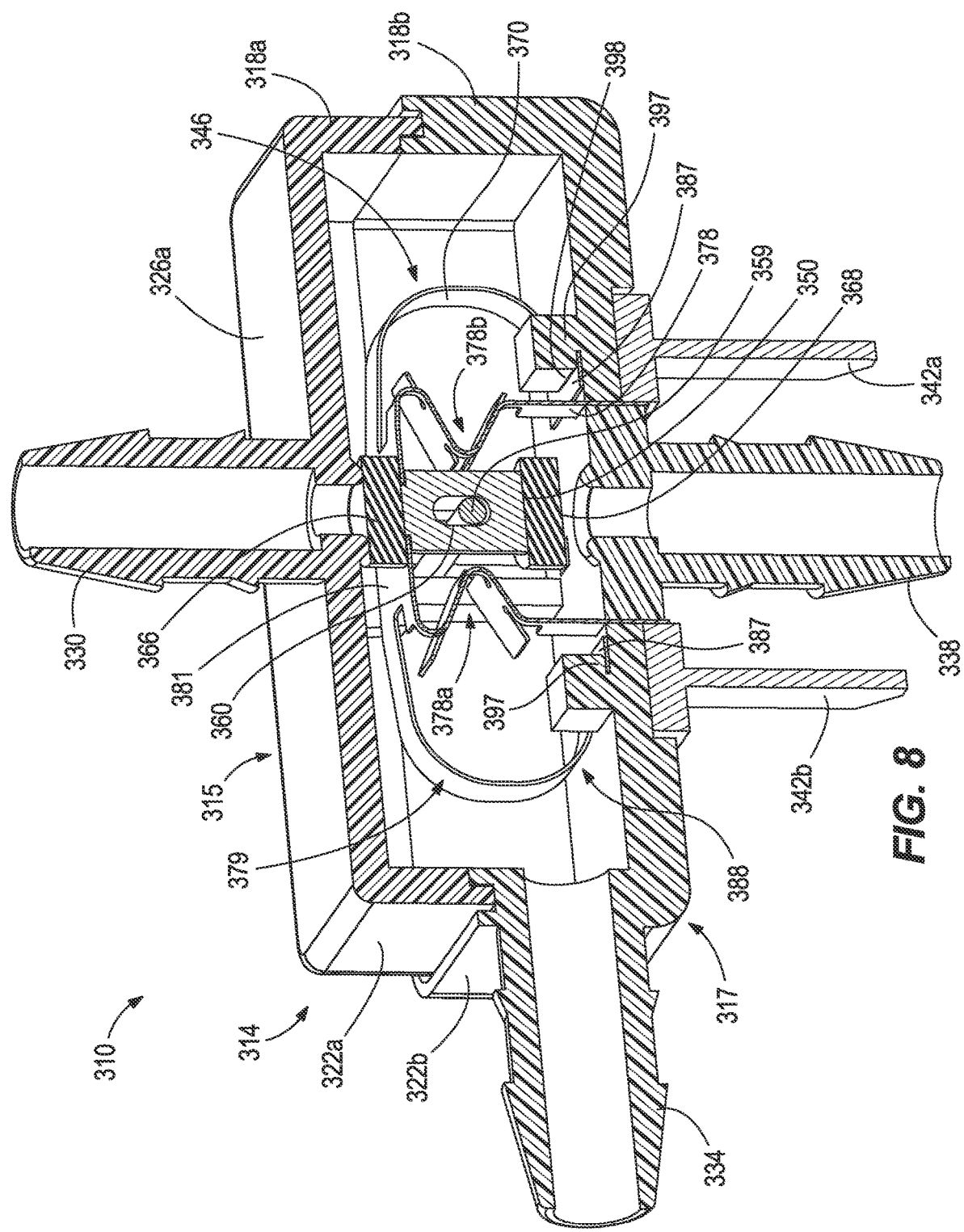
FIG. 8 is a cross-sectional view of the fluid management system of FIG. 7, taken along line 8.

FIGS. 7-8 illustrate a fluid management system 310 according to another embodiment. The illustrated fluid management system 310 is similar to the fluid management system 10 described with reference to FIGS. 1-2C. Features and elements of the system 310 corresponding with features and elements of the system 10 are given corresponding reference numbers plus '300.' In addition, the following description focuses primarily on differences between the system 310 and the system 10. It should be understood that features and elements of the system 10 may be incorporated into the system 310, and vice versa.

The fluid management system 310 includes a housing 314 having a first portion 315 and a second portion 317 coupled to the first portion 315 in a substantially air-tight manner. The first portion 315 has a first end wall 318*a*, a second end wall 322*a*, and a plurality of side walls 326*a* extending between the first end wall 318*a* and the second end wall 322*a*. The second portion 317 has a first end wall 318*b*, a second end wall 322*b*, and a plurality of side walls 326*b* extending between the first end wall 318*b* and the second end wall 322*b*. In this embodiment, a pressure port 330 extends from one of the plurality of side walls 326*a*, a vent port 338 and electrodes 342*a*, 342*b* extend from one of the plurality of side walls 326*b*, and a bladder port 334 extends from the second end wall 322*b*.

With reference to FIG. 8, an actuator assembly 346 is contained within the housing 314. The actuator assembly 346 includes a valve body or piston 350 with a slot 360. In this illustrated embodiment, a pin 359 is received in the slot 360 so that the piston 350 is operable to slide in a transverse direction relative to the pin 359. That is, the pin 359 and the slot 360 generally constrain movement of the piston 350 along a single axis. An actuator in the form of a metal plate spring 379 is supported within the housing 314 (e.g., in place of the first spring 70 and the second spring 78 described above with reference to FIGS. 1 and 2).

Figure 6:
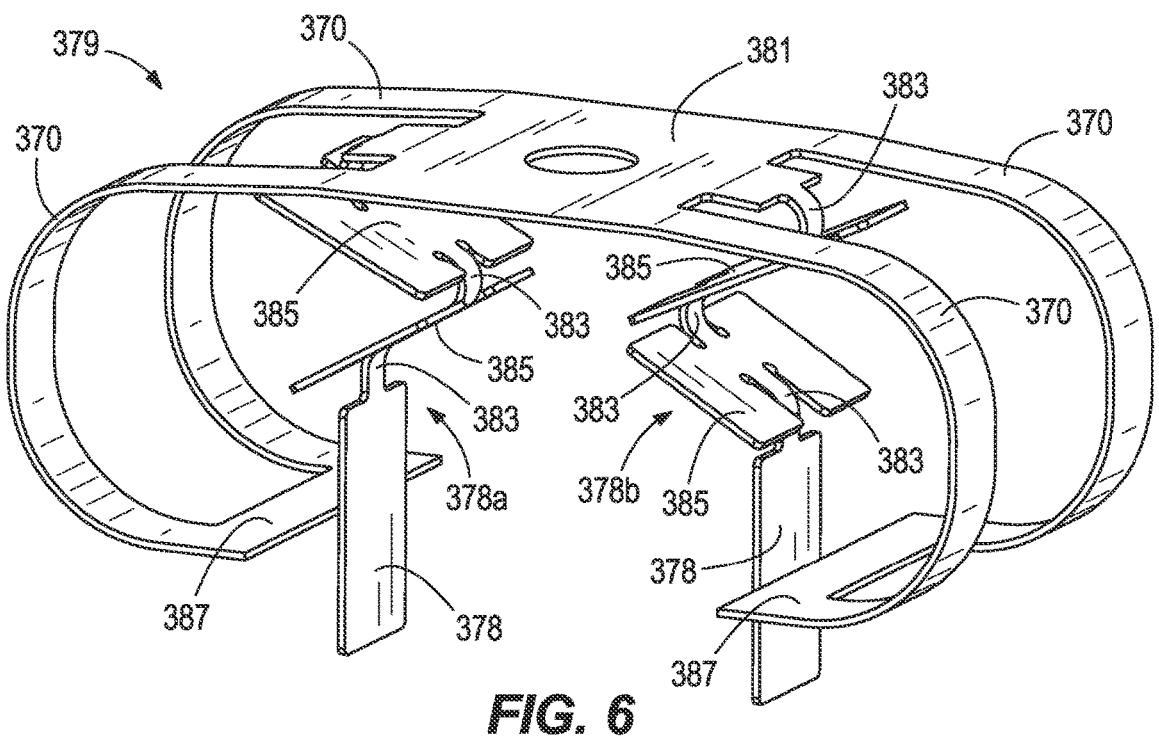
FIG. 6 is a perspective view of a smart material actuator in accordance with an embodiment of the disclosure, for use with a fluid management system.

Referring to FIG. 6, the plate spring 379 includes a pair of legs 378 and a plurality of curved biasing elements 370, which are arranged in two pairs in the illustrated embodiment, extending in opposite directions from a generally flat platform or stage 381. Each of the legs 378 includes an actuating portion 378*a* with a plurality of narrow bridges 383 interconnected by wider, heat dissipating portions 385. In the illustrated embodiment, the biasing elements 370 of each pair are joined at their distal ends by a generally flat foot portion 387. The foot portions 387 extend generally parallel with the stage 381 in the illustrated embodiment.

The illustrated plate spring 379 is manufactured by laser cutting or stamping a flat, monolithic piece of material, although other methods may be used. The plate spring 379 is made of a smart material, and more particularly, a shape memory alloy material, and the actuating portions 378*a* of the legs 378 are processed to reach a desirable temperature-based response. The structure is then shape-set as illustrated in FIG. 6. In other embodiments, the plate spring 379 may be made from multiple components fastened or engaged together in any suitable manner. For example, in some embodiments, the biasing elements 370 may be formed separately and coupled to the stage 381 by welding, brazing, soldering, or the like.

Like the second spring 78 described above with reference to FIGS. 1 and 2, the actuating portions 378*a* have a temperature-dependent behavior. That is, the actuating portions 378*a* have one shape or dimension associated with a martensitic crystalline structure at low temperature and another shape or dimension associated with an austenitic crystalline structure at high temperature. The transformation is reversible, such that the shape and/or size of the actuating portions 378*a* can be selectively varied. The manufacturing process allows the sheet metal plate spring 379 to function in an operating temperature range, for example −40° C. to +80° C. (or other temperature ranges if required).

Referring to FIG. 8, the plate spring 379 is positioned within the housing 314 such that the legs 378 contact the electrodes 342*a*, 342*b*. The stage 381 is coupled to the piston 350. The electrodes 342*a*, 342*b* are electrically coupled to a power source such that the power source, the electrodes 342*a*, 342*b*, the legs 378, and the stage 381 form an electric circuit 382. Alternatively, the legs 378 may extend from the housing 314 to be directly electrically coupled the power source, a PCB, or the like.

With continued reference to FIG. 8, the housing 314 may include internal support features 388 that support the actuator assembly 346. For example, in the illustrated embodiment, the second portion 317 of the housing 314 includes a plurality of posts 397 extending inwardly toward the first housing portion 315. The posts 397 include slots 398 that receive the foot portions 387 of the plate spring 379. As such, the posts 397 may secure the plate spring 379 within the housing 314. In other embodiments, additional or alternative support feature(s) 388 may be provided to secure the plate spring 379 within the housing 314.

In some embodiments, to assemble the fluid management system 310, the actuator assembly 346 may be installed into the second housing portion 317. For example, in the illustrated embodiment, the biasing members 370 may be deformed inwardly until the foot portions 387 are disposed inwardly of the posts 397. Then, the actuator assembly 346 may be positioned against the second housing portion 317 and the biasing members 370 released. The foot portions 387 may then move outwardly and into the respective slots 398 in the posts 397, thereby securing the plate spring 379 of the actuator assembly 346 in its installed position.

With the actuator assembly 346 installed, the first housing portion 315 may be moved toward the second housing portion 317 to couple the housing portions 315, 317 together and enclose the actuator assembly 346 within the housing 314. As the first housing portion 315 is moved toward the second housing portion 317, the first housing portion 315 may engage against the piston 350 and move the piston 350 toward the second housing portion 317, deforming the plate spring 379 and applying a desired preload to the biasing elements 370. This deformation may also pre-strain the actuating portions 378a, 378b, which may advantageously provide for more consistent operation of the actuating portions 378a, 378b.

In operation, the piston 350 is movable between a first or inflating position and a second or deflating position (illustrated in FIG. 8) to selectively inflate or deflate a vessel coupled to the bladder port 334. To inflate the vessel, the pressurized air source supplies pressurized air to the pressurized air port 330, and the power source is energized. The power source drives current through the electric circuit 382 such that current flows from the power source through the legs 378. The narrow bridges 383 of the actuating portions 378a are heated when current flows through them. The shape memory alloy material contracts, forcing the stage 381 downward, which moves the piston 350 toward the vent port 338. The vent port seal element 368 engages and seals the vent port 338. Thus, the source of pressurized air pressurizes the interior of the housing 314 and inflates the vessel coupled to the bladder port 334.

In some embodiments, the pin 359 may be movable (e.g., manually, via an electric or pneumatic actuator, or via any other means) into a position in which the pin 359 engages the bottom end of the slot 360 in the piston 350. The pin 359 may thus hold the piston 350 in the inflating position. Embodiments incorporating a movable pin may allow the power source to be deenergized while the piston 350 is held in the inflating position. In other embodiments, the pin 359 may only guide the piston 350.

To deflate the vessel, the power source is deenergized to cease driving current through the electric circuit 382 such that current no longer flows from the power source through the actuating portions 378a of the legs 378. Without current flowing through the legs 378, the narrow bridges 383 cool and expand. The biasing elements 370 restore the sheet metal plate spring 379 to its original shape, which moves the piston 350 to the deflating position. In the deflating position, the pressure port seal element 366 engages and seals the pressure port 330, while the vent port seal element 368 moves away from the vent port 338. As such, pressurized air is prevented from entering the interior of the housing 314 through the pressure port 330, and the interior of the housing 314 fluidly communicates with the ambient environment through the vent port 338. This allows the vessel coupled to the bladder port 334 to deflate.

In alternative embodiments, the structure of the actuator assembly 346 and/or the actuating portions 378a of the plate spring 379 may be configured to expand when heated, rather than contract. In such embodiments, the positions of the pressure port 330 and the vent port 338 are reversed.

Figure 9:
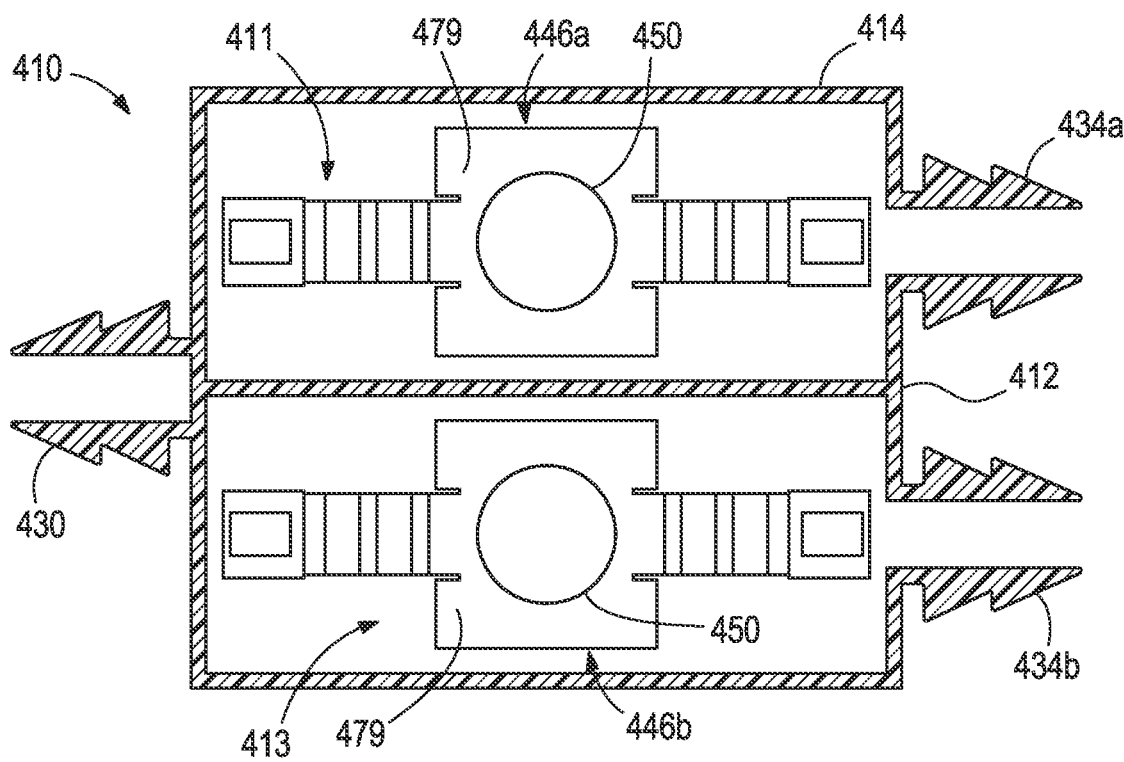
FIG. 9 is a cross-sectional view of a fluid management system in accordance with another embodiment of the disclosure.

FIG. 9 illustrates a fluid management system 410 according to another embodiment. The illustrated fluid management system 410 is similar to the fluid management system 310 described above with reference to FIGS. 7-8. Features and elements of the system 410 corresponding with features and elements of the system 310 are given corresponding reference numbers plus '100.' In addition, the following description focuses primarily on differences between the system 410 and the system 310. It should be understood that features and elements of the system 10 may be incorporated into the system 310, and vice versa.

Referring to FIG. 9, the system 410 includes a housing 414. The housing 414 has a divider 412 dividing the housing 414 into a first chamber 411 and a second chamber 413. In the illustrated embodiment, a pressure port 430 is fluidly coupled to both the first chamber 411 and the second chamber 413. The system 410 further includes vent ports (not shown) and bladder ports 434a, 434b associated with each of the chambers 411, 413.

The first chamber 411 and the second chamber 413 of the housing 414 each contain an actuator assembly 446a, 446b with a valve body or piston 450 coupled to a plate spring 479, like the plate spring 379 described above with reference to FIG. 6.

In operation, to inflate vessels coupled to the bladder ports 434a, 434b, the pressurized air source supplies pressurized air through the pressure port 430 while the piston bodies 450 are positioned to seal the vent ports. To deflate the vessels, the power source (not shown) is energized to actuate the plate springs 479a, 479b, which in turn opens the vent ports. The pressurized air source is shut off, and the vessels deflate.

Figure 10:
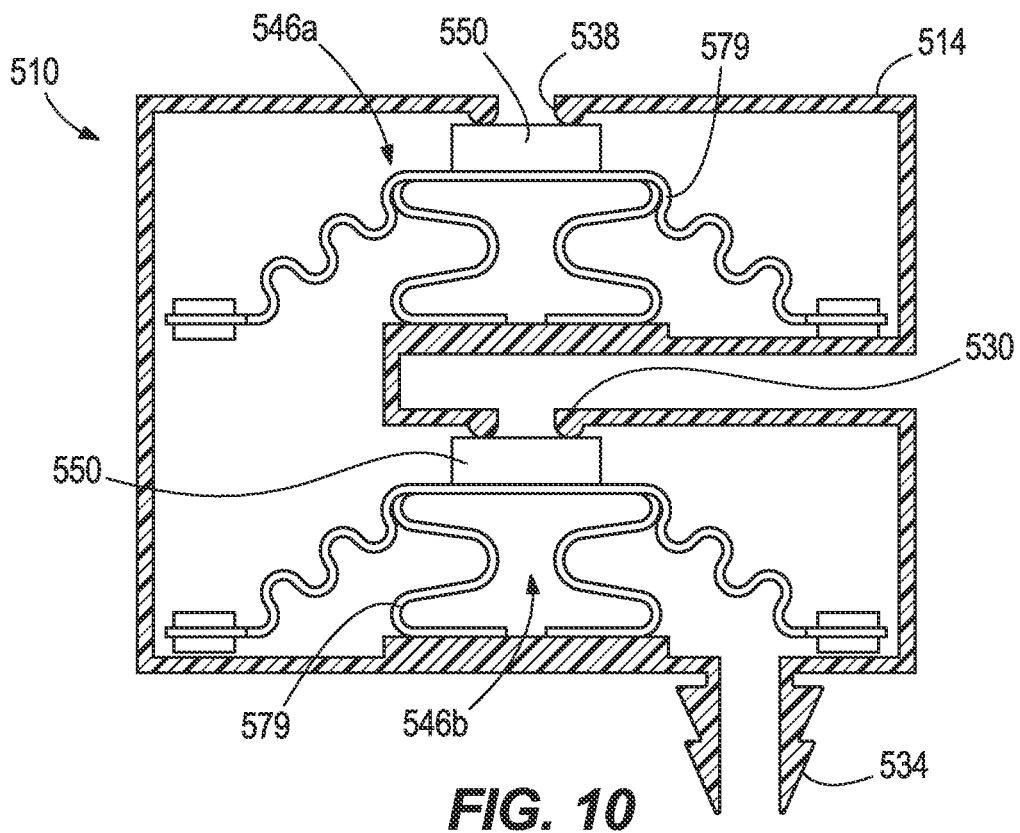
FIG. 10 is a cross-sectional view of a fluid management system in accordance with another embodiment of the disclosure.

FIG. 10 illustrates a fluid management system 510 according to another embodiment. The fluid management system 510 is similar to the fluid management system 310 of FIGS. 7-8B. Features and elements of the system 510 corresponding with features and elements of the fluid management system 310 are given corresponding reference numbers plus '200.' In addition, the following description focuses primarily on differences between the system 510 and the system 310. It should be understood that features and elements of the system 510 may be incorporated into the system 310, and vice versa.

Referring to FIG. 10, the system 510 includes a housing 514, a pressure port 530, a bladder port 534, and a vent port 538. The housing 514 contains two actuator assemblies 546a, 546b, each having a piston 550 coupled to a plate spring 579, like the plate spring 379 described above with reference to FIG. 6. The actuator assemblies 546a, 546b can be independently actuated to provide the system 510 with an inflating position in which the pressure port 530 is open and the vent port 538 is closed, a deflating position in which the pressure port 530 is closed and the vent port 538 is open, and a neutral position (illustrated in FIG. 10) in which the pressure port 530 and the vent port 538 are both closed, such that pressure may be held within the vessel coupled to the bladder port 534.

In operation, to inflate a vessel coupled to the bladder port 534, the pressurized air source supplies pressurized air through the pressure port 530. The power source energizes the second actuator assembly 546b, which causes the plate spring 579 of the second actuator assembly 546b to contract and thereby open the pressure port 530. To deflate the vessel, the power source energizes the first actuator assembly 546a, which causes the plate spring 579 of the first actuator assembly 546a to contract and thereby open the vent port 550.

Figure 11:
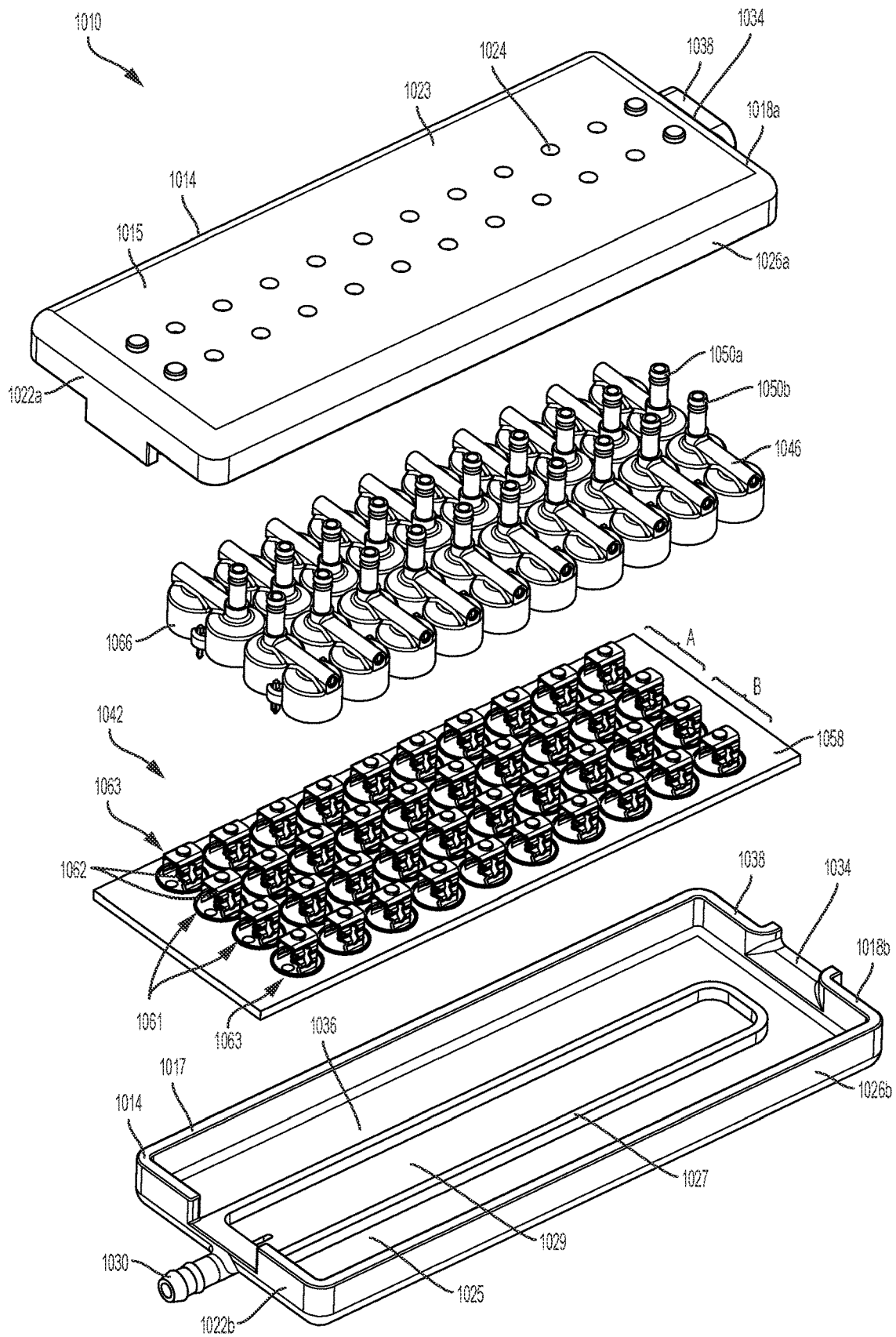
FIG. 11 is an exploded view of a fluid management system in accordance with another embodiment of the disclosure.

FIGS. 11-15 illustrate a fluid management system 1010 according to another embodiment. The system 1010 includes a housing 1014 with an upper portion 1015 and a lower portion 1017 coupled to the upper portion 1015 (FIG. 11). In some embodiments, the upper and lower portions 1015, 1017 may be coupled together so as to form a substantially air-tight seal therebetween. The upper portion 1015 has a first end wall 1018a, a second end wall 1022a, a top wall 1023, and a pair of longitudinal side walls 1026a extending between the end walls 1018a, 1022a. The top wall 1023 includes a plurality of apertures 1024 extending therethrough. The lower portion 1017 has a first end wall 1018b, a second end wall 1022*b*, a bottom wall 1025, and a pair of side walls 1026*b* extending between the end walls 1018*b*, 1022*b*. In the illustrated embodiment, the lower portion 1017 of the housing 1014 includes a rib 1027 extending upward from the bottom wall 1025. The rib 1027 forms the perimeter of an air chamber, which defines an intake manifold 1029 of the fluid management system 1010. The remaining interior of the housing 1014 outside of the intake manifold 1029 defines an exhaust manifold 1036 of the fluid management system 1010.

With continued reference to FIG. 11, the illustrated system 1010 includes a system pressure port 1030 that communicates with the intake manifold 1029 in the housing 1014 and a system vent port 1034 that communicates with the exhaust manifold 1036. In the illustrated embodiment the system pressure port 1030 is integrally formed (e.g. molded) as part of the lower portion 1017 of the housing 1014 and the system vent port 1034 is integrally formed as an opening 1038 in the housing 1014. The system pressure port 1030 may be formed as a barb fitting extending from the first end wall 1018*b* and the opening 1038 may be formed in the first end walls 1018*a*, 1018*b*. In other embodiments, the system pressure and vent ports 1030, 1034 may include other types of fittings suitable to the application and/or arranged in other configurations. The system pressure port 1030 may be coupled to a source of pressurized fluid (e.g., an air pump) or to a valve assembly or fluidic switching module configured to route the pressurized fluid to the system pressure port 1030. The system vent port 1034 is in fluid communication with the environment surrounding the system 1010.

The fluid management system 1010 further includes a valve block 1042 disposed within the housing 1014. The valve block 1042 includes a valve cover 1046 having a first plurality of container connection ports 1050*a* and a second plurality of container connection ports 1050*b* arranged in two parallel rows and extending through respective apertures 1024 in the top wall 1023 of the upper housing portion 1015. Each of the container connection ports 1050*a*, 1050*b* includes a barb fitting in the illustrated embodiment; however, the ports 1050*a*, 1050*b* may have other arrangements and/or configurations to suit a particular application. The container connection ports 1050*a*, 1050*b* are configured to be coupled to one or more vessels for containing a pressurized fluid (e.g., an air bladder), either directly or via hoses or other suitable channels.

Figure 11A:
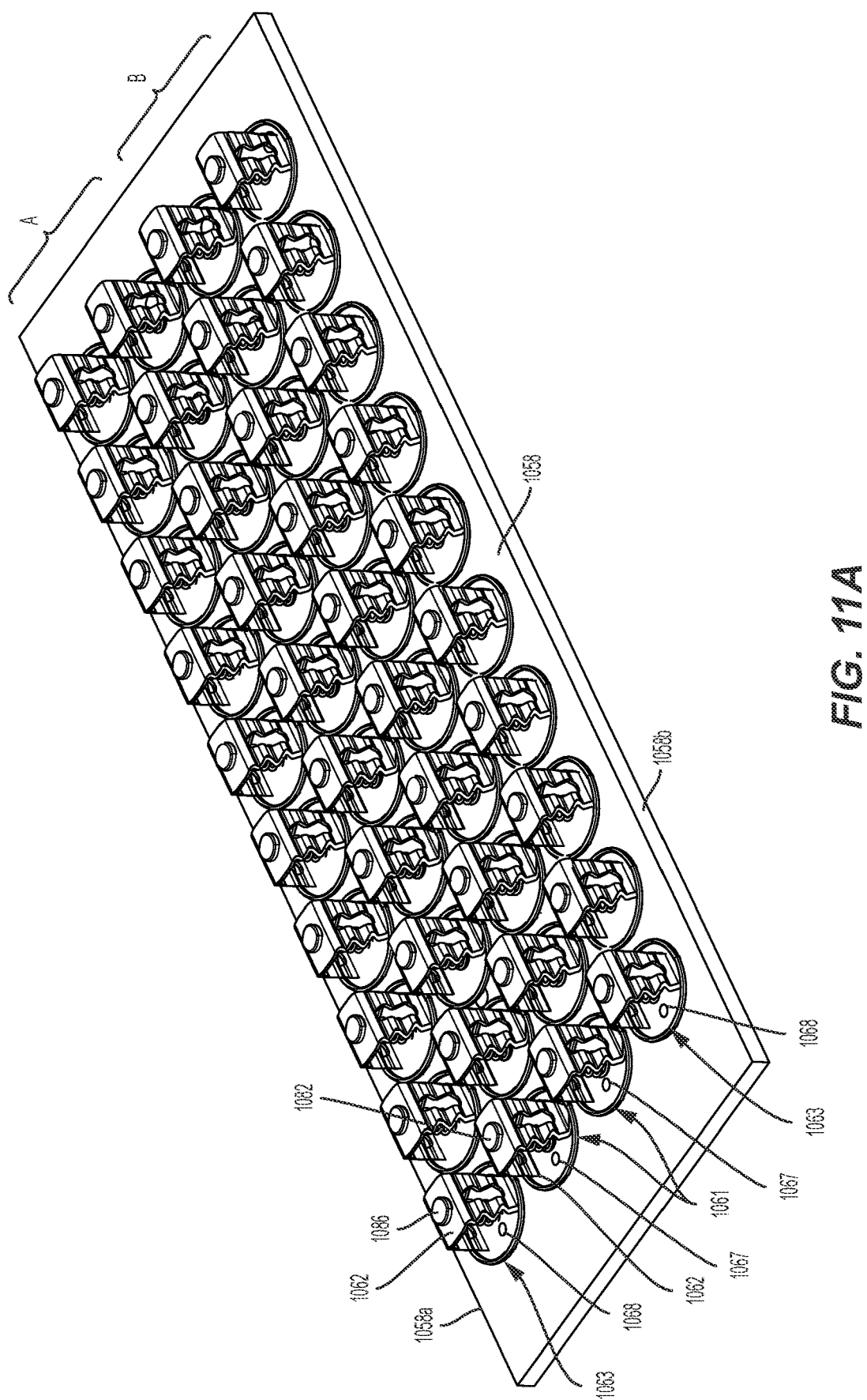
FIG. 11A is a perspective view of a printed circuit board of the fluid management system of FIG. 11.

The valve block 1042 further includes a printed circuit board (PCB) 1058. The valve cover 1046 is coupled to a top side of the PCB 1058 and encloses a plurality of intake valves 1061, a plurality of vent valves 1063, and a plurality of actuators 1062 coupled to the PCB 1058 and controlled by the PCB 1058 to actuate the respective valves 1061, 1063. (FIG. 11A). The PCB 1058 may include electrodes or wires (not shown) extending from the housing 1014 for connection to a power source.

Figure 12:
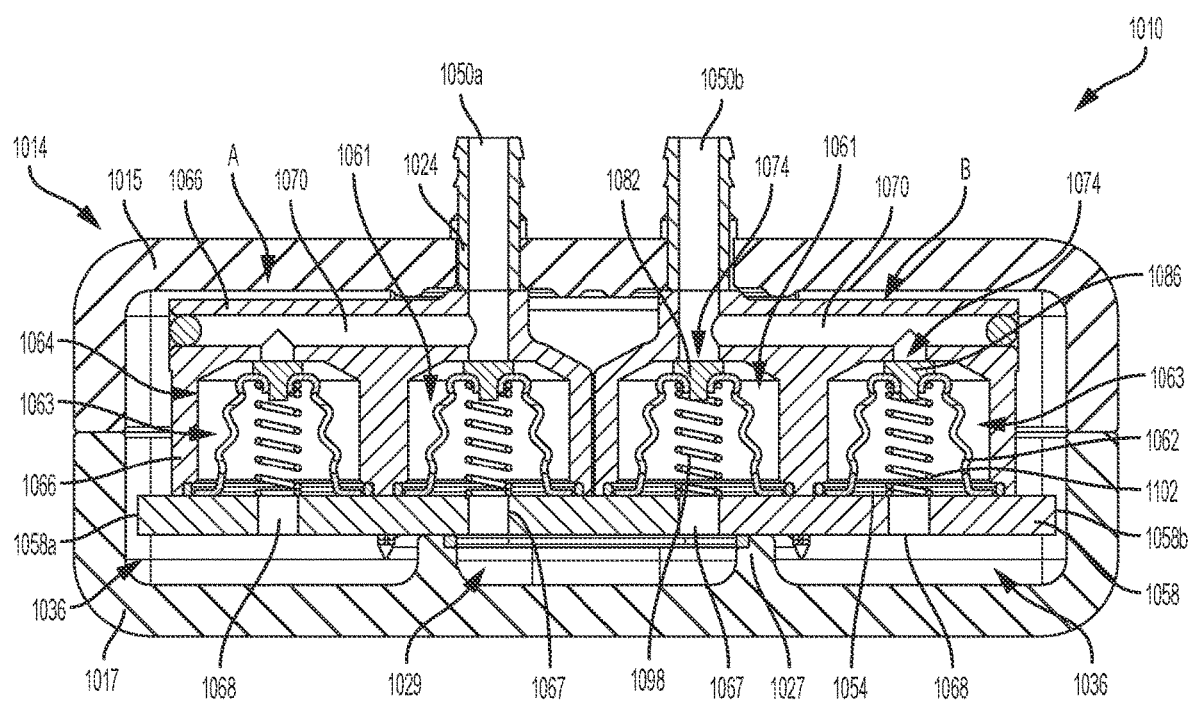
FIG. 12 is a cross-sectional view of the fluid management system of FIG. 1.

With reference to FIG. 12, the valve block 1042 may be installed in the housing such that the PCB 1058 is positioned adjacent the rib 1027. In particular, the bottom surface of the PCB 1058 sealingly engages the rib 1027 in the illustrated embodiment to isolate the intake manifold 1029 from the exhaust manifold 1036 (i.e. the rest of the space contained by the housing 1014). In some embodiments, a sealing element (e.g., a gasket, sealing compound, or the like) may be disposed between the rib 1027 and the PCB 1058 to improve the seal between the intake manifold 1029 and the exhaust manifold 1036.

The valve cover 1046 includes a plurality of annular walls 1066, each defining an interior chamber 1064 in which a respective one of the intake valves 1061 or vent valves 1063 and its associated actuator 1062 is received. The annular walls 1066 are preferably sealed against the top surface of the PCB 1058 (e.g., via a gasket, sealing compound, weld, or the like). The valve cover 1046 may be formed monolithically (e.g., from a rigid plastic via a molding process in some embodiments), or alternatively, the valve cover 1046 may include a plurality of pieces coupled to the PCB 1058 during assembly.

With reference to FIGS. 11A and 12, the PCB 1058 includes a plurality of intake ports 1067 extending through the PCB 1058 and a plurality of vent ports 1068 extending through the PCB 1058. The intake ports 1067 are arranged in two rows on opposite sides of a longitudinal center plane of the PCB 1058. The intake ports 1067 are aligned with and in fluid communication with the intake manifold 1029 (FIG. 12). The vent ports 1068 are arranged in two rows on opposite sides of the intake ports 1067. As such, a first row of vent ports 1068 extends proximate a first longitudinal side 1058*a* of the PCB 1058, and a second row of vent ports 1068 extends proximate a second, opposite longitudinal side 1058*b* of the PCB 1058. (FIG. 11A). The vent ports 1068 are aligned with and in fluid communication with the exhaust manifold 1036. (FIG. 12).

The valve cover 1046 is positioned such that each chamber 1064 is aligned and in fluid communication with one of the intake ports 1067 or vent ports 1068. A container port 1074 is formed at the top end of each chamber 1064. In the illustrated embodiment, the intake valves 1061 and the vent valves 1063 (and their associated chambers 1064) are arranged in pairs A, B. The container ports 1074 in the pair A are fluidly coupled to a first container connection port 1050*a* via a passageway 1070. Likewise, the container ports 1074 in the pair B are fluidly coupled to a second container connection port 1050*b* via a passageway 1070. The intake valves 1061 are operable to selectively fluidly communicate the container connection ports 1050*a*, 1050*b* with the intake manifold 1029 (e.g., to inflate the vessels connected to the ports 1050*a*, 1050*b*), and the vent valves 1063 are operable to selectively fluidly communicate the container connection ports 1050*a*, 1050*b* with the exhaust manifold 1036 (e.g., to deflate the vessels connected to the ports 1050*a*, 1050*b*).

Each of the intake valves 1061 includes a first valve body or first piston 1082, and each of the vent valves 1063 includes a second valve body or second piston 1086. Each piston 1082, 1086 is coupled to a respective actuator 1062 operable to move the piston 1082, 1086 in an axial direction of the piston 1082, 1086.

More specifically, the first piston 1082 is movable between an open position (FIG. 14) in which the first piston 1082 is spaced from the container port 1074 to allow fluid communication between the intake manifold 1029 and the container connection port 1050*a* or 1050*b*, and a closed position (FIG. 15) in which the first piston 1082 blocks the container port 1074 to substantially inhibit fluid communication between the intake manifold 1029 and the container connection port 1050*a* or 1050*b*. Similarly, the second piston 1086 is movable between an open position (FIG. 15) in which the second piston 1086 is spaced from the container port 1074 to allow fluid communication between the exhaust manifold 1036 and the container connection port 1050*a* or 1050*b*, and a closed position (FIG. 14) in which the second piston 1086 blocks the container port 1074 to substantially inhibit fluid communication between the exhaust manifold 1036 and the container connection port 1050*a* or 1050*b*.

A first biasing element or first spring 1098 extends between the PCB 1058 and the first piston 1082, and a second biasing element or second spring 1102 extends between the PCB 1058 and the second piston 1086. In the illustrated embodiment, the first spring 1098 and second spring 1102 are compression springs made of spring steel. The springs 1098, 1102 bias the respective pistons 1082, 1086 toward the closed position. As such, the intake and vent valves 1061, 1063 are normally closed valves.

Figure 13:
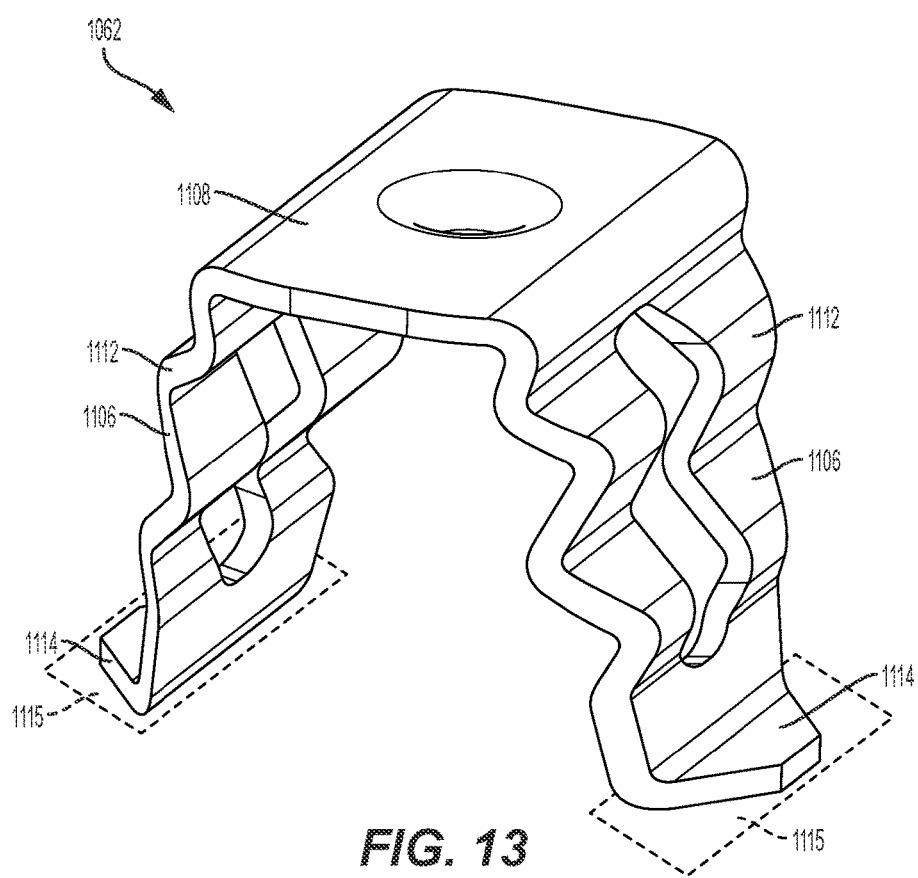
FIG. 13 is a perspective view of a smart material actuator of the fluid management system of FIG. 1.

Referring to FIG. 13, the illustrated actuator 1062 is configured as a plate spring, which may be similar to the plate spring 379 described above. The illustrated actuator 1062 includes two legs 1106 extending from a generally flat platform or stage 1108. The legs 1106 include actuating portions 1112 and feet 1114. The feet 1114 are configured to mechanically mount and electrically connect to mounting points 1115 on the PCB 1058. The illustrated actuator 1062 may be manufactured by laser cutting or stamping a flat monolithic piece of material, and then bending the material into its final shape illustrated in FIG. 13. The illustrated actuator 1062 is made of a smart material, in particular, a shape memory alloy material, and the actuating portions 1112 are processed to reach a desirable temperature-based response. The actuating portions 1112 have temperature-dependent behavior, that is, the actuating portions have one shape or dimension associated with a martensitic crystalline structure at low temperature and another shape or dimension associated with an austenitic crystalline structure at high temperature. The transformation is reversible, such that the shape and/or size of the actuating portions can be selectively varied, thereby moving the stage 1108, in response to heating the actuating portions 1112. The manufacturing process allows the sheet metal actuator 1062 to function in an operating temperature range, for example −40 C to +80 C (or other temperature ranges if required).

The illustrated fluid management system 1010 is operable to switch between a closed or hold configuration (FIG. 12) in which fluid is held within the vessel(s) connected to the container connection ports 1050a, 1050b, an inflating configuration (FIG. 14) in which pressurized fluid is routed to inflate the vessel(s), and a deflating configuration (FIG. 15) in which pressurized fluid is vented from the vessel(s) to the surrounding environment to deflate the vessel(s).

In the hold configuration (FIG. 12), the first pistons 1082 and the second pistons 1086 are both in their closed positions to prevent fluid from flowing through the container ports 1070 in either direction. The springs 1098, 1102 maintain the pistons 1082, 1086 in their closed positions, such that the fluid management system 1010 remains in the hold configuration when no current is run through the actuators 1062.

Figure 14:
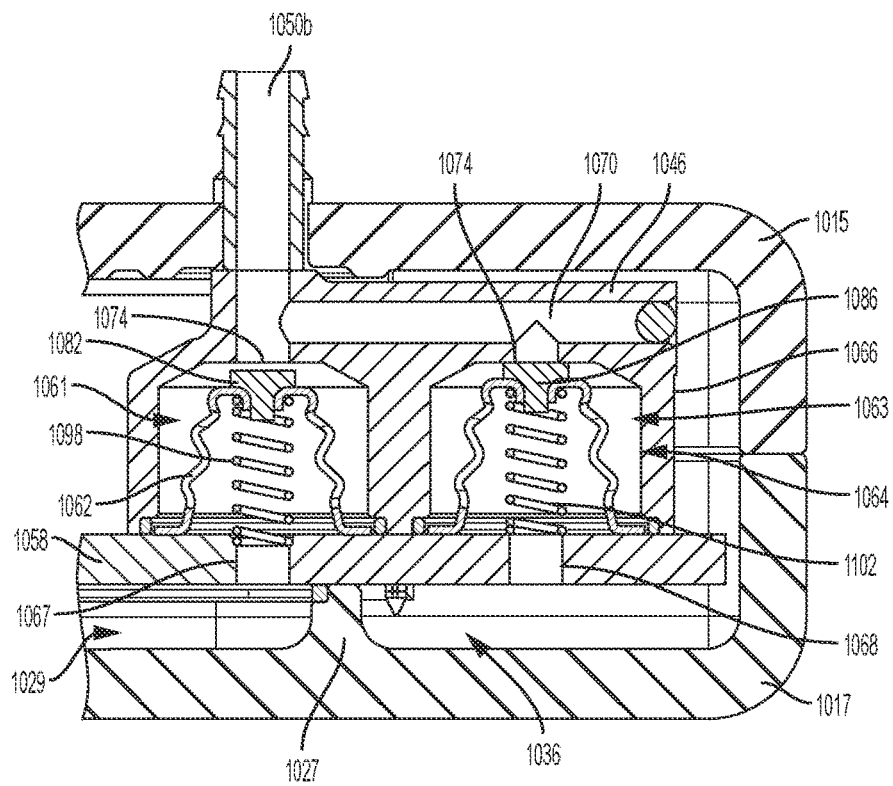
FIG. 14 is a partial cross-sectional view of the fluid management system of FIG. 12 in an inflating configuration.

To switch to the inflating configuration, shown in FIG. 14, the PCB 1058 routes electrical current through the actuators 1062 associated with the intake valves 1061. As the actuators 1062 heat up, they contract and move the first pistons 1082 away from the associated container ports 1074. This allows air from the intake manifold 1029 to flow through the intake ports 1067 in the PCB 1058, through the container ports 1074, and out the container connector ports 1050a, 1050b to inflate the vessel(s). The second pistons 1086 remain in their closed positions to substantially inhibit fluid communication with the exhaust manifold 1036.

Figure 15:
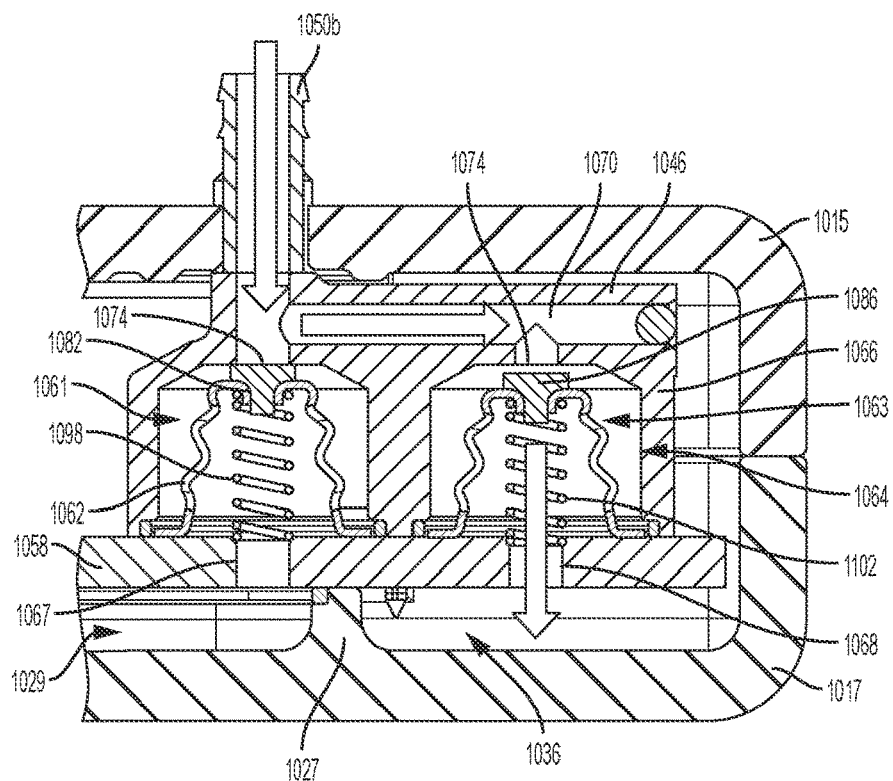
FIG. 15 is a partial cross-sectional view of the fluid management system of FIG. 12 in a deflating configuration.

To switch to the deflating configuration, shown in FIG. 15, the PCB 1058 routes electrical current through the actuators 1062 associated with the vent valves 1063. As the actuators 1062 heat up, they contract and move the second pistons 1086 away from the associated container ports 1074. This allows air from the vessel(s) to flow through the container ports 1074, through the vent ports 1068 in the PCB 1058, and out into the exhaust manifold 1036 to deflate the vessel(s). Meanwhile, the actuators 1062 for the intake valves 1061 cool and expand, and the first springs 1098 move the first pistons 1082 to their closed positions to substantially inhibit fluid communication with the intake manifold 1029. In some embodiments, the source of pressurized fluid that supplies fluid to the intake manifold 1029 may shut off when in the deflating configuration. In other embodiments, the intake manifold 1029 may remain pressurized in the deflating configuration (e.g., so that some vessels connected to the fluid management system 1010 may be inflated as others are deflated, and vise versa).

In some embodiments, the pairs A, B of intake and vent valves 1061, 1063 may be controlled together or in an alternating manner. In addition, different rows of valves 1061, 1063 may be independently controlled to produce a desired inflation/deflation pattern. The fluid management system 1010 may thus be advantageously employed to control inflation and deflation of a relatively large number of vessels (e.g., at least 10 vessels in some embodiments, or at least 20 vessels in some embodiments). This may be particularly advantageous in seating applications to produce lumbar support and/or massaging effects.

Figure 16:
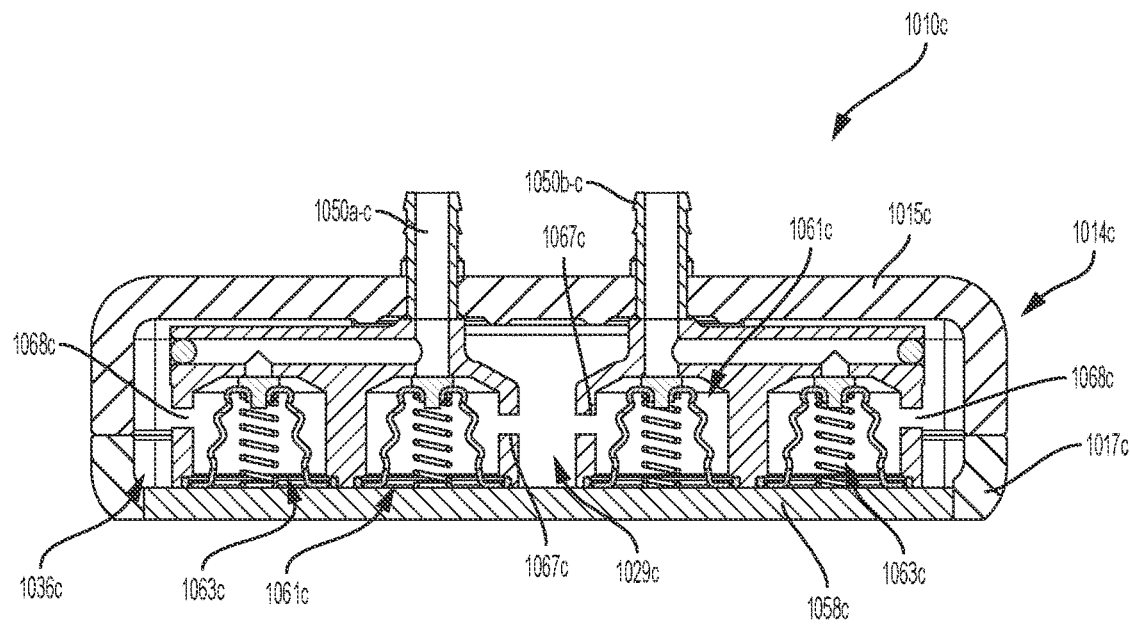
FIG. 16 is a cross-sectional view of a fluid management system according to another embodiment of the disclosure.

FIG. 16 illustrates another embodiment of a fluid management system 1010c that is similar to the system 1010 described above with reference to FIGS. 11-15, and features and elements corresponding to features and elements of the system 1010 are given identical reference numbers appended with the letter 'c'. In the illustrated embodiment, the PCB 1058c forms the bottom wall of the lower housing 1017c. The intake manifold 1029c is defined between the two rows of intake valves 1061c, and the exhaust manifold 1036c is defined outside the outer periphery of the rows of vent valves 1063c. As such, the intake ports 1067c and vent ports 1068c are oriented horizontally, instead of extending vertically through the PCB 1058c.

Figure 17:
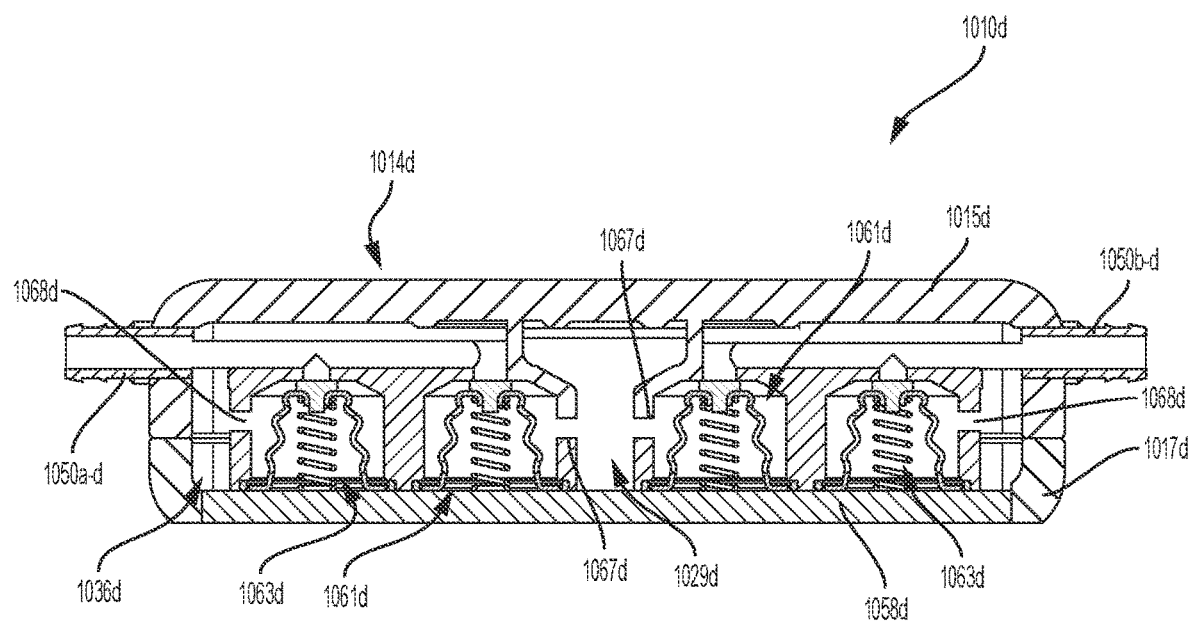
FIG. 17 is a cross-sectional view of a fluid management system according to another embodiment of the disclosure.

FIG. 17 illustrates another embodiment of a fluid management system 1010d that is similar to the system 1010c described above with reference to FIG. 16, and features and elements corresponding to features and elements of the system 1010c are given identical reference numbers appended with the letter 'd'. In the illustrated embodiment, the container connection ports 1050a-d and 1050b-d of the system 1010d extend horizontally through the sides of the housing 1014d, rather than vertically through the top of the housing 1014d.

Figure 18:
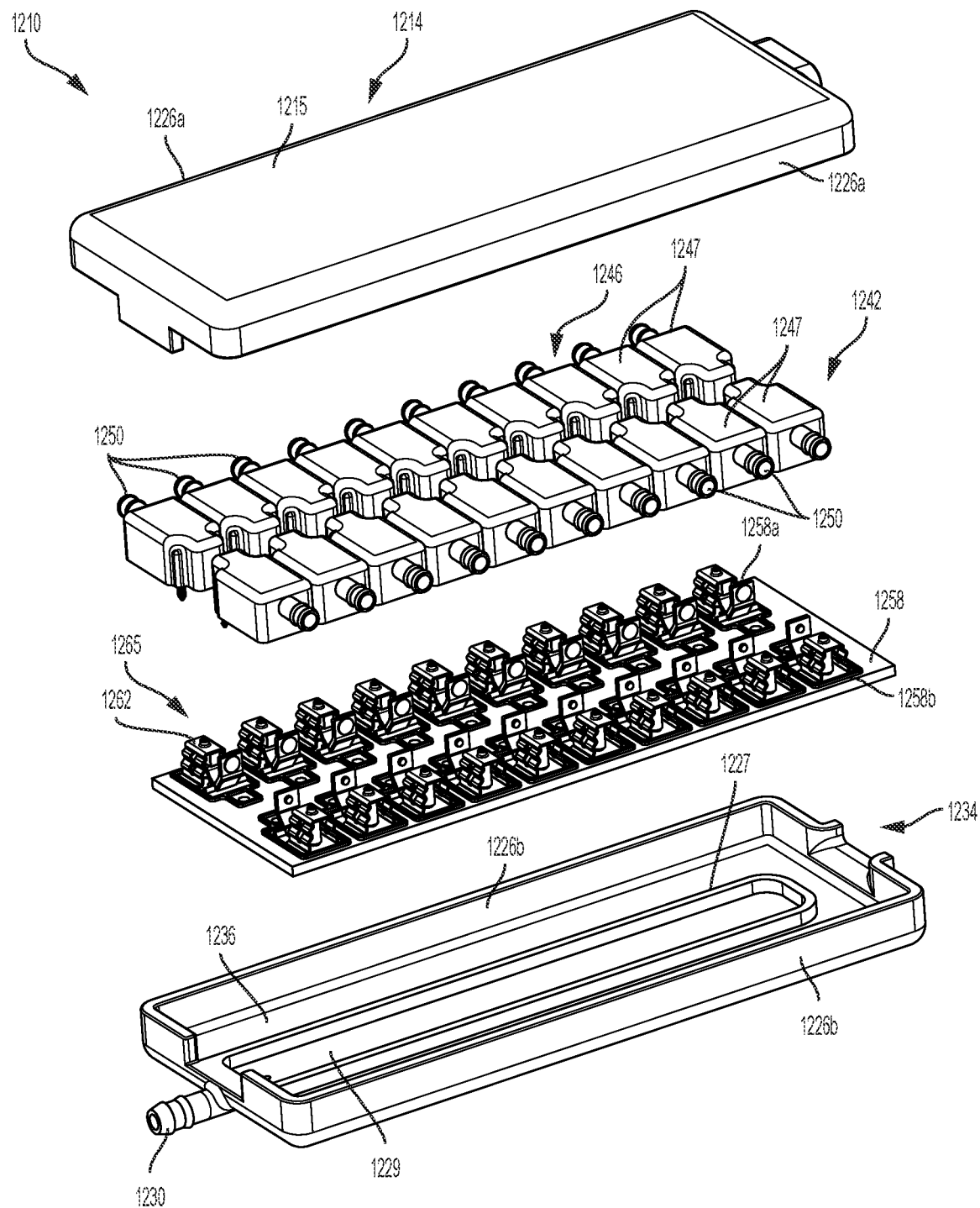
FIG. 18 is an exploded perspective view of a fluid management system according to another embodiment of the disclosure.
Figure 19:
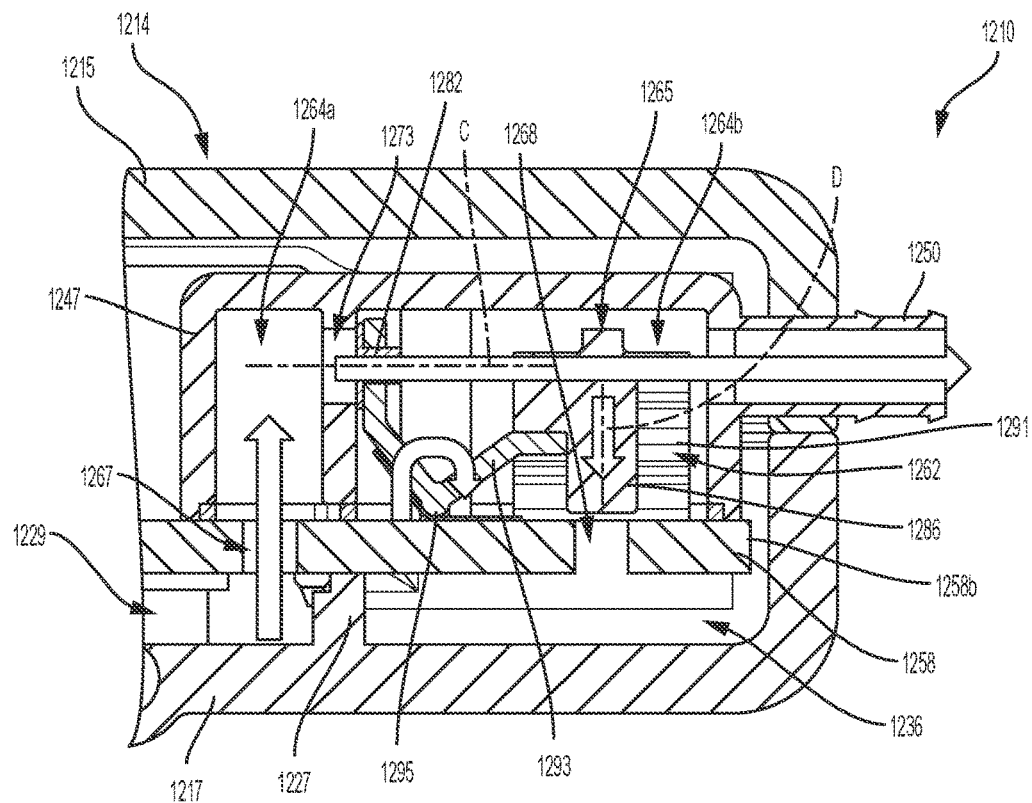
FIG. 19 is a partial cross-sectional view of the fluid management system of FIG. 18 illustrated in an inflating configuration.
Figure 20:
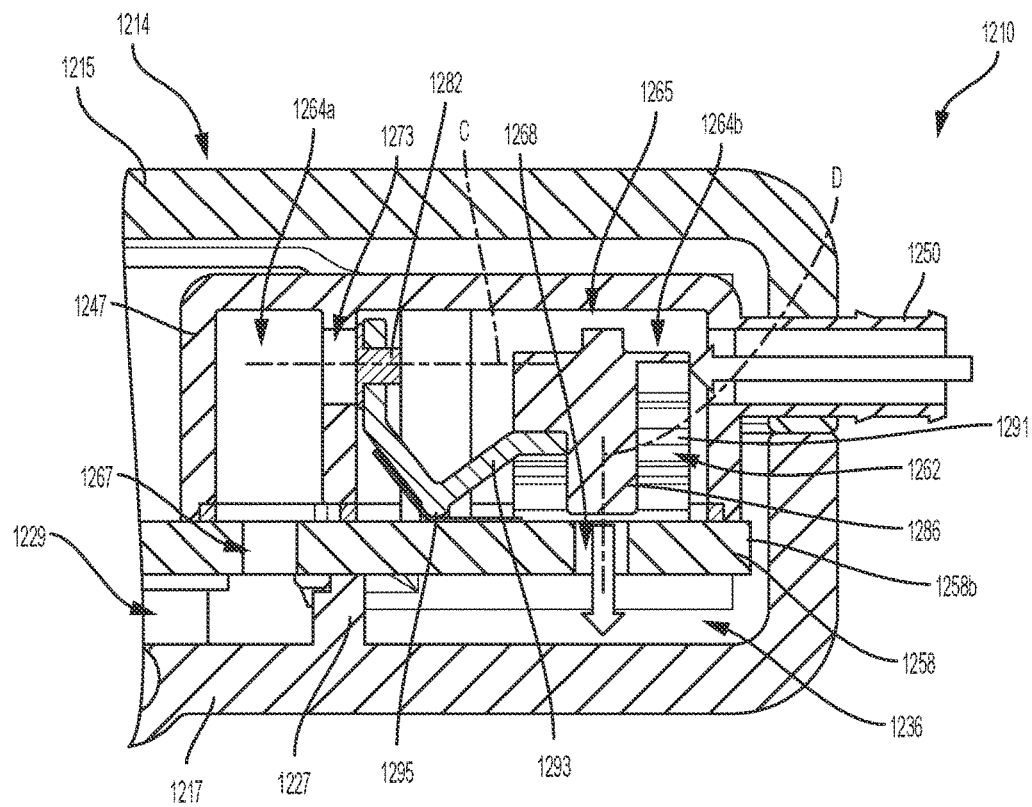
FIG. 20 is a partial cross-sectional view of the fluid management system of FIG. 18 illustrated in a deflating configuration.

FIGS. 18-20 illustrate a fluid management system 1210 according to another embodiment. The fluid management system 1210 is similar to the fluid management system 1010 of FIGS. 11-15. Features and elements of the system 1210 corresponding with features and elements of the fluid management system 1010 are given corresponding reference numbers plus '200.' In addition, the following description focuses primarily on differences between the system 1210 and the system 1010. It should be understood that features and elements of the system 1210 may be incorporated into the system 1010 (or, into the systems 1010c and 1010d), and vice versa.

The system 1210 includes a housing 1214 with an upper portion 1215 and a lower portion 1217 coupled to the upper portion 1215 (FIG. 18). The upper portion 1215 has a pair of longitudinal side walls 1226a extending in a length direction of the housing 1214. The lower portion 1217 likewise has a pair of longitudinal side walls 1226b extending in the length direction of the housing 1214. In the illustrated embodiment, the lower portion 1217 of the housing 1214 includes a rib 1227 that forms the perimeter of an intake manifold 1229 of the fluid management system 1210. The remaining interior of the housing 1214 outside of the intake manifold 1229 defines an exhaust manifold 1236 of the fluid management system 1210.

With continued reference to FIG. 18, the illustrated system 1210 includes a system pressure port 1230 that communicates with the intake manifold 1229 in the housing 1214 and a system vent port 1234 that communicates with the exhaust manifold 1236. The system pressure port 1230 may be coupled to a source of pressurized fluid (e.g., an air pump) or to a valve assembly or fluidic switching module configured to route the pressurized fluid to the system pressure port 1230. The system vent port 1234 is in fluid communication with the environment surrounding the system 1210.

The fluid management system 1210 further includes a valve block 1242 disposed within the housing 1214. The valve block 1242 includes a valve cover 1246 having a plurality of container connection ports 1250 arranged in two parallel rows and extending between the side walls 1226a, 1226b of the housing 1214 (FIG. 19). In some embodiments, the side walls 1226a, 1226b may define apertures through which the container connection ports 1250 may extend. Each of the container connection ports 1250 includes a barb fitting in the illustrated embodiment; however, the ports 1250 may have other arrangements and/or configurations to suit a particular application. The container connection ports 1250 are configured to be coupled to one or more vessels for containing a pressurized fluid (e.g., an air bladder), either directly or via hoses or other suitable channels.

The valve block 1242 further includes a printed circuit board (PCB) 1258. The valve cover 1246 is coupled to a top side of the PCB 1228 and encloses a plurality of valve assemblies 1265 and a plurality of actuators 1262 coupled to the PCB 1258 and controlled by the PCB 1258 to actuate the respective valve assemblies 1265. The PCB 1258 may include electrodes or wires (not shown) extending from the housing 1214 for connection to a power source.

With reference to FIG. 19, the valve block 1242 may be installed in the housing such that the PCB 1258 is positioned adjacent the rib 1257. In particular, the bottom surface of the PCB 1258 sealingly engages the rib 1227 in the illustrated embodiment to isolate the intake manifold 1229 from the exhaust manifold 1236 (i.e. the rest of the space contained by the housing 1014).

In the illustrated embodiment, the valve cover 1246 includes a plurality of cover segments 1247 (FIG. 19), each defining a first chamber 1264a and a second chamber 1264b. The second chamber 1264b of each cover segment 1247 encloses a corresponding valve assembly 1265 and actuator 1262. Each of the cover segments 1247 includes a respective one of the container connection ports 1250 extending from and in fluid communication with the second chamber 1264b. The cover segments 1247 are preferably coupled to and sealed against the top surface of the PCB 1258 (e.g., via a gasket, sealing compound, weld, or the like). In other embodiments, the valve cover 1246 may be formed monolithically (e.g., from a rigid plastic via a molding process in some embodiments).

With continued reference to FIG. 19, the PCB 1258 includes a plurality of intake ports 1267 extending through the PCB 1258 and a plurality of vent ports 1268 extending through the PCB 1258. The intake ports 1267 are arranged in two rows on opposite sides of a longitudinal center plane of the PCB 1258. The intake ports 1267 are aligned with and in fluid communication with the intake manifold 1229. The vent ports 1268 are arranged in two rows on opposite sides of the intake ports 1267. As such, a first row of vent ports 1268 extends proximate a first longitudinal side 1258a (FIG. 18) of the PCB 1258, and a second row of vent ports 1268 extends proximate a second, opposite longitudinal side 1258b of the PCB 1258. The vent ports 1268 are aligned with and in fluid communication with the exhaust manifold 1236 (FIG. 19).

In some embodiments, the intake manifold 1229 and the exhaust manifold 1236 may be reversed. In some embodiments, the PCB 1258 may form the bottom wall of the lower housing 1217 (e.g., similar to the embodiments of the fluid management systems 1010c, 1010d described above with reference to FIGS. 16-17).

Each segment 1247 of the valve cover 1246 is positioned such that the first chamber 1264a is aligned with one of the intake ports 1267, and the second chamber 1264b is aligned with one of the vent ports 1268. A pressure port 1273 connects the first chamber 1264a and the second chamber 1264b. The valve assembly 1265 is operable to selectively fluidly communicate the associated container connection port 1250 with the intake manifold 1229 (e.g., to inflate the vessel connected to the ports 1250), and to selectively fluidly communicate the container connection port 1250 with the exhaust manifold 1236 (e.g., to deflate the vessel connected to the port 1250).

Figure 18A:
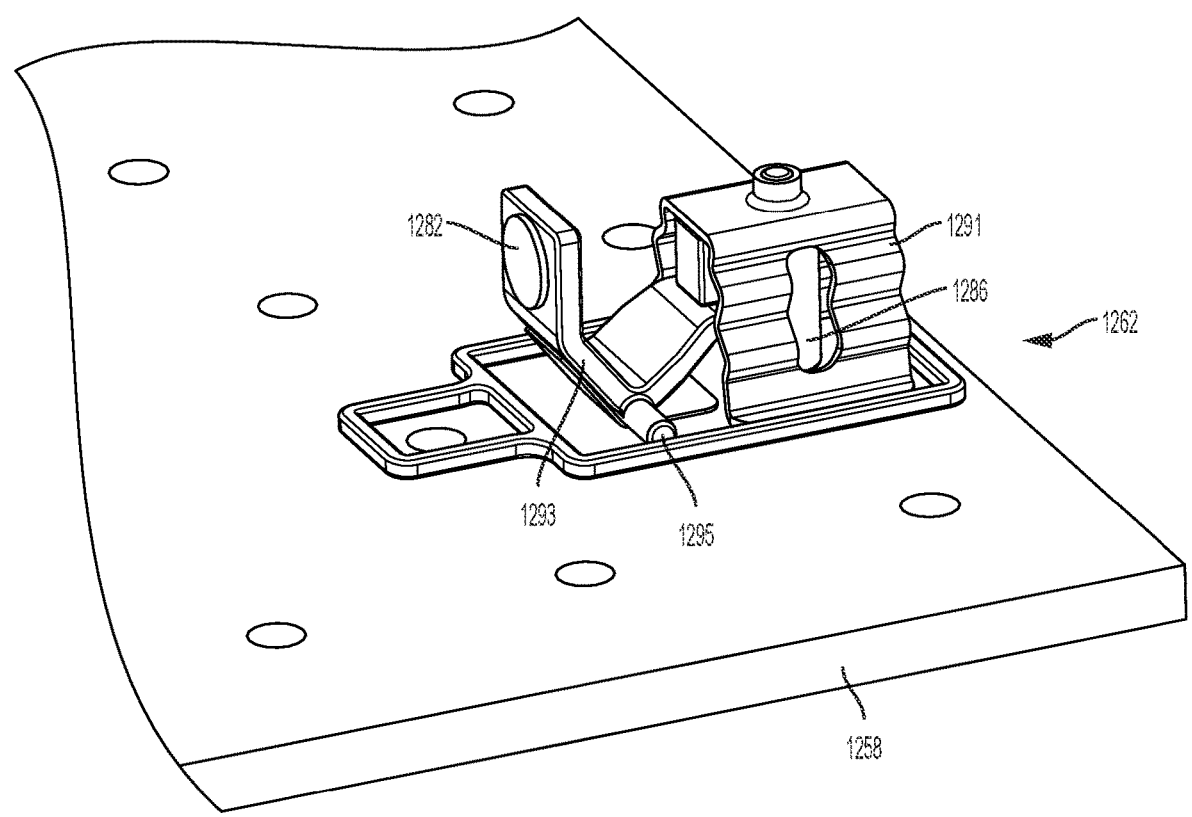
FIG. 18A is a perspective view illustrating an actuator of the fluid management system of FIG. 18.

Referring to FIGS. 18A-20, each of the valve assemblies 1265 includes an intake valve portion with a first piston 1282 and a vent valve portion with a second piston 1286. The actuator 1262 includes a plate spring 1291 (such as the plate spring described above with reference to FIG. 13) coupled to the second piston 1286 and a lever 1293 coupled to the first piston 1282. (FIG. 18A). The actuator 1262 is operable to move the first piston 1282 along a first axis C of the first piston 1282 and to move the second piston 1286 along a second axis D of the second piston 1286. (FIG. 19). In the illustrated embodiment, the first axis C is perpendicular to the second axis D.

More specifically, the first piston 1282 is movable between an open position in which the first piston 1282 is spaced from the pressure port 1273 to allow fluid communication between the intake manifold 1229 and the second chamber 1264b (and thus, the container connection port 1250), and a closed position in which the first piston 1282 blocks the pressure port 1274 to substantially inhibit fluid communication between the intake manifold 1229 and the container connection port 1050. Similarly, the second piston 1286 is movable between an open position in which the second piston 1286 is spaced from the vent port 1268 to allow fluid communication between the exhaust manifold 1236 and the second chamber 1264b (and thus, the container connection port 1250), and a closed position in which the second piston 1286 blocks the vent port 1268 to substantially inhibit fluid communication between the exhaust manifold 1236 and the container connection port 1250. The lever 1293 synchronizes movement of the first and second pistons 1282, 1286 such that the first piston 1282 moves toward its open position when the second piston 1286 moves toward its closed position, and vice versa.

The illustrated fluid management system 1210 is operable to switch between an inflating configuration (FIG. 19) in which pressurized fluid is routed to inflate the vessel(s), and a deflating configuration (FIG. 20) in which pressurized fluid is vented from the vessel(s) to the surrounding environment to deflate the vessel(s).

With reference to FIG. 19, to move one of the valve assemblies 1265 to the inflating configuration, the PCB 1258 routes electrical current through the plate spring 1291 of the actuator 1262 associated with the valve assembly 1265. As the plate spring 1291 heats up, it contracts and moves the second piston 1286 toward the vent port 1268 along the second axis D and into its closed position to substantially inhibit fluid communication between the second chamber 1264b and the exhaust manifold 1236. As the second piston 1286 moves toward the vent port 1268, the lever 1293 pivots clockwise (with reference to the orientation of FIG. 19) about a pivot point 1295, causing the first piston 1282 to move away from the pressure port 1273 along the first axis C and into its open position. This allows pressurized fluid to flow from the intake manifold 1029, through the intake port 1267, and into the first chamber 1264a. The fluid then flows into the second chamber 1264b through the pressure port 1273, and then out through the container connection port 1250 to inflate the vessel.

To move one of the valve assemblies 1265 to the deflating configuration illustrated in FIG. 20, the PCB 1258 interrupts the flow of current through the plate spring 1291, allowing it to cool. As the plate spring 1291 cools, it expands and moves the second piston 1286 away from the vent port 1268 along the second axis D and into its open position to permit fluid communication between the second chamber 1264b and the exhaust manifold 1236. As the second piston 1286 moves away from the vent port 1268, the lever 1293 pivots counterclockwise about the pivot point 1295, causing the first piston 1282 to move toward the pressure port 1273 along the first axis C and into its closed position. Thus, fluid communication between the intake manifold 1229 and the second chamber 1264b is substantially inhibited, and fluid may flow out of the vessel through the container connection port 1250, into the second chamber 1264b, and out into the exhaust manifold 1236 via the vent port 1268.

Each of the valve assemblies 1265 of the fluid management system 1210 may be independently controlled or grouped together with other valve assemblies 1265 to produce a desired inflation/deflation pattern in the connected vessels. The fluid management system 1210 may be advantageously employed to control inflation and deflation of a relatively large number of vessels (e.g., at least 10 vessels in some embodiments, or at least 20 vessels in some embodiments). This may be particularly advantageous in seating applications to produce lumbar support and/or massaging effects.

FIGS. 21-24 illustrate a fluid management system 1410 according to another embodiment. The fluid management system 1410 is similar to the fluid management system 1010 described above with reference to FIGS. 11-15. As such, features and elements of the fluid management system 1410 corresponding with features and elements of the fluid management system 1010 are given corresponding reference numbers plus '400.' In addition, the following description focuses primarily on differences between the system 1410 and the system 1010. It should be understood that features and elements of the system 1410 may be incorporated into the system 1010 (or, into the systems 1010c, 1010d, and 1210), and vice versa.

Figure 21:
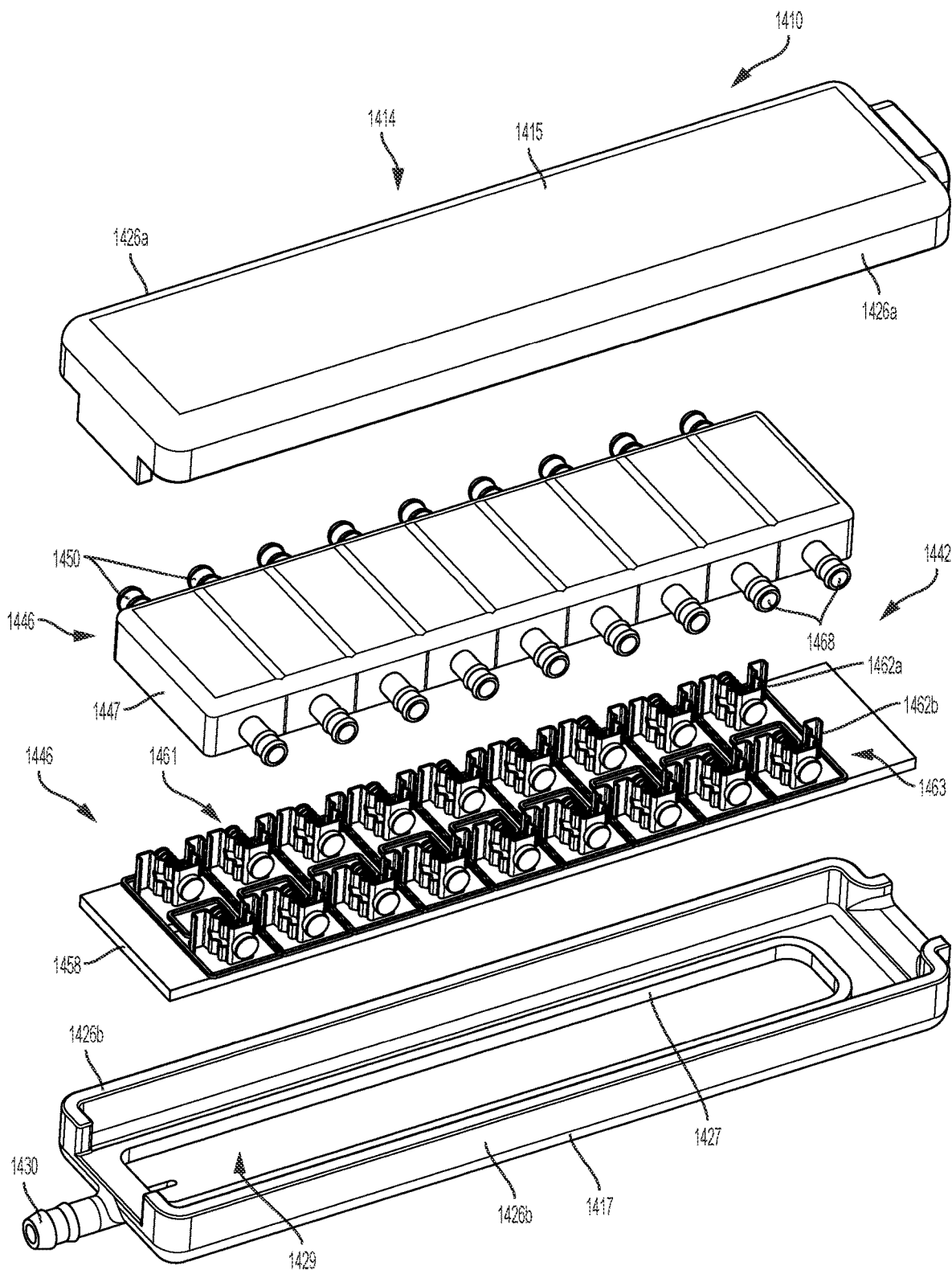
FIG. 21 is an exploded perspective view of a fluid management system according to another embodiment of the disclosure.

The system 1410 includes a housing 1414 with an upper portion 1415 and a lower portion 1417 coupled to the upper portion 1415 (FIG. 21). The upper portion 1415 has a pair of longitudinal side walls 1426a extending in a length direction of the housing 1414. The lower portion 1417 likewise has a pair of longitudinal side walls 1426b extending in the length direction of the housing 1414. In the illustrated embodiment, the lower portion 1417 of the housing 1414 includes a rib 1427 that forms the perimeter of an intake manifold 1429 of the fluid management system 1410.

With continued reference to FIG. 21, the illustrated system 1410 includes a system pressure port 1430 that communicates with the intake manifold 1429. The system pressure port 1430 may be coupled to a source of pressurized fluid (e.g., an air pump) or to a valve assembly or fluidic switching module configured to route the pressurized fluid to the system pressure port 1430.

The fluid management system 1410 further includes a valve block 1442 disposed within the housing 1414. The valve block 1442 includes a valve cover 1446 formed with a plurality of sections 1447, each section 1447 including a container connection port 1450 and a vent port 1468 disposed on opposite sides of the section 1447. The valve cover sections 1447 are positioned adjacent one another along the length of the housing 1414, such that the container connection ports 1450 and the vent ports 1468 are arranged in respective rows on opposite longitudinal sides of the housing 1414. The ports 1450, 1468 may extend between the side walls 1426a, 1426b of the housing 1414, or the side walls 1426a, 1426b may define apertures through which the container connection ports 1450 and the vent ports 1468 may extend.

Each of the container connection ports 1450 and vent ports 1468 includes a barb fitting in the illustrated embodiment; however, the ports 1450, 1468 may have other arrangements and/or configurations to suit a particular application. The container connection ports 1450 are configured to be coupled to one or more vessels for containing a pressurized fluid (e.g., an air bladder), either directly or via hoses or other suitable channels. The vent ports 1468 are in communication with the environment surrounding the housing 1414.

The valve block 1442 further includes a printed circuit board (PCB) 1458. The valve cover 1446 is coupled to a top side of the PCB 1458 and encloses a plurality of intake valves 1461, a plurality of vent valves 1463, a plurality of intake valve actuators 1462a coupled to the PCB 1458 and controlled by the PCB 1458 to actuate the respective intake valves 1461, and a plurality of vent valve actuators 1462b coupled to the PCB 1458 and controlled by the PCB 1458 to actuate the respective vent valves 1463. The intake valve actuators 1462a and vent valve actuators 1462b may each be similar to the actuator 1062 described above with reference to FIG. 13. The PCB 1458 may include electrodes or wires (not shown) extending from the housing 1414 for connection to a power source.

Figure 23:
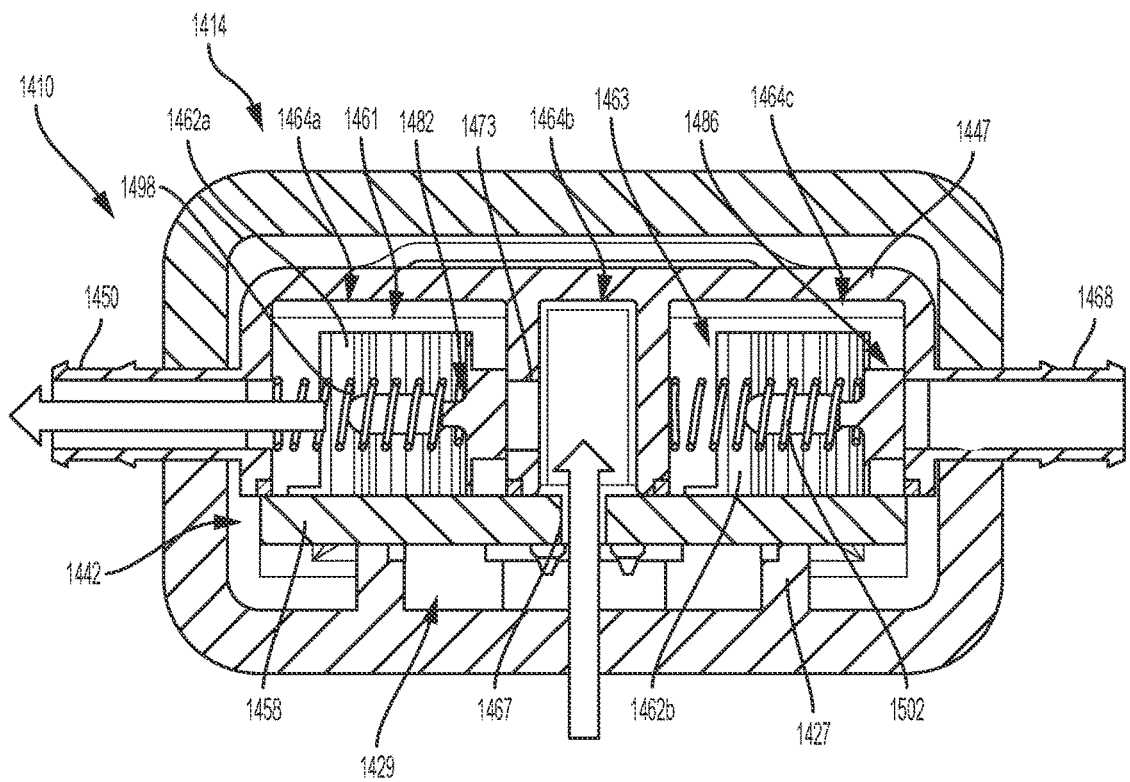
FIG. 23 is a cross-sectional view of the fluid management system of FIG. 21 illustrated in an inflating configuration.

With reference to FIG. 23, the valve block 1442 may be installed in the housing 1414 such that the PCB 1458 is positioned adjacent the rib 1427. In particular, the bottom surface of the PCB 1458 sealingly engages the rib 1427 to seal the intake manifold 1429 from the surrounding volume inside the housing 1414. In other embodiments, the PCB 1458 may form the bottom wall of the lower housing 1417 (e.g., similar to the embodiments of the fluid management systems 1010c, 1010d described above with reference to FIGS. 16-17).

Figure 22:
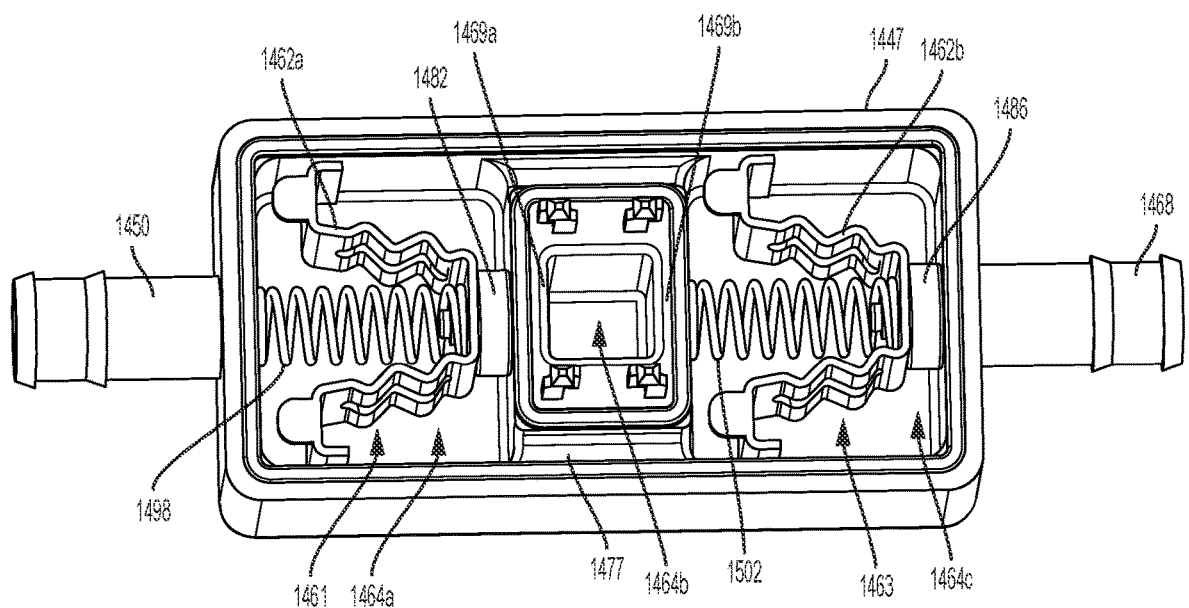
FIG. 22 is a bottom perspective view illustrating an actuator assembly of the fluid management system of FIG. 21.

Referring to FIGS. 22-23, each cover segment 1447 includes a first wall 1469a and a second wall 1469b that divide the interior of the cover segment 1447 into a first chamber 1464a, a second chamber 1464b, and a third chamber 1464c. The cover segments 1447 are preferably coupled to and sealed against the top surface of the PCB 1458 (e.g., via a gasket, sealing compound, weld, or the like). In other embodiments, the valve cover 1446 may be formed monolithically (e.g., from a rigid plastic via a molding process).

The first chamber 1464a is in fluid communication with the container connection port 1450, the second chamber 1464b is in fluid communication with the intake manifold 1429 via an intake port 1467 that extends through the PCB 1458, and the third chamber 1464c is in fluid communication with the vent port 1468. A bypass channel 1477 (FIG. 22) interconnects the first chamber 1464a and the third chamber 1464c, allowing fluid flow between the two chambers 1464a, 1464c. The first wall 1469a includes a pressure port 1473 through which fluid may flow from the second chamber 1464b to the first chamber 1464a.

In the illustrated embodiment, each of the cover segments 1447 encloses an intake valve 1461, an intake valve actuator 1462a, a vent valve 1463, and a vent valve actuator 1462b. Specifically, the intake valve 1461 and intake valve actuator 1462a are disposed within the first chamber 1464a, and the vent valve 1463 and vent valve actuator 1462b are disposed within the third chamber 1464c. The intake valve 1461 is operable to selectively fluidly communicate the container connection port 1450 with the intake manifold 1429 (e.g., to inflate the vessel connected to the port 1450), and the vent valve 1463 is operable to selectively fluidly communicate the container connection port 1450 with the vent port 1468 (e.g., to deflate the vessel connected to the port 1450).

With reference to FIG. 23, each intake valve 1461 includes a first piston 1482 coupled to the associated intake valve actuator 1462a. Each vent valve 1463 includes a second piston 1486 coupled to the associated vent valve actuator 1462b. The first piston 1482 is movable between an open position in which the first piston 1482 is spaced from the pressure port 1473 to allow fluid communication between the intake manifold 1429 and the first chamber 1464a (and thus, the container connection port 1450), and a closed position in which the first piston 1482 blocks the pressure port 1473 to substantially inhibit fluid communication between the intake manifold 1429 and the container connection port 1450. The first piston 1482 is biased toward the closed position by a first spring 1498.

Similarly, the second piston 1486 is movable to an open position in which the second piston 1486 is spaced from the vent port 1468 to allow fluid communication between the third chamber 1464c and the vent port 1468. This in turn establishes fluid communication between the first chamber 1264a (and thus, the container connection port 1450) and the vent port 1468 via the bypass channel 1477 (FIG. 22). The second piston 1486 is movable to a closed position in which the second piston 1486 blocks the vent port 1468 to substantially inhibit fluid communication between the third volume 1464c and the vent port 1468. The second piston 1486 is biased toward the closed position by a second spring 1502.

The illustrated fluid management system 1410 is operable to switch between a closed or hold configuration in which fluid is held within the vessel(s) connected to the container connection ports 1450, an inflating configuration (FIG. 23) in which pressurized fluid is routed to inflate the vessel(s), and a deflating configuration (FIG. 24) in which pressurized fluid is vented from the vessel(s) to the surrounding environment to deflate the vessel(s).

In the hold configuration, the first pistons 1482 and the second pistons 1486 are both in their closed positions to prevent fluid from flowing through the pressure port 1473 or the vent port 1468. The springs 1498, 1502 maintain the pistons 1482, 1486 in their closed positions, such that the fluid management system 1410 remains in the hold configuration when no current is run through the actuators 1462a-b. Pressure from the vessel connected to the container connection port 1450 may also act on the rear faces of the pistons 1482, 1486 to aid in maintaining the pistons 1482, 1486 in their closed positions.

Referring to FIG. 23, to switch to the inflating configuration, the PCB 1458 routes electrical current through the intake valve actuator 1462a associated with a selected intake valve 1461. As the actuator 1462a heats up, it contracts and moves the first piston 1482 away from the associated pressure port 1473. This allows air from the intake manifold 1429 to flow through the intake port 1467 in the PCB 1458, into the second chamber 1464b, through the pressure port 1473, into the first chamber 1464a, and out the container connector port 1450 to inflate the vessel. The second piston 1486 remains in its closed position to substantially inhibit fluid communication with the surrounding environment.

Figure 24:
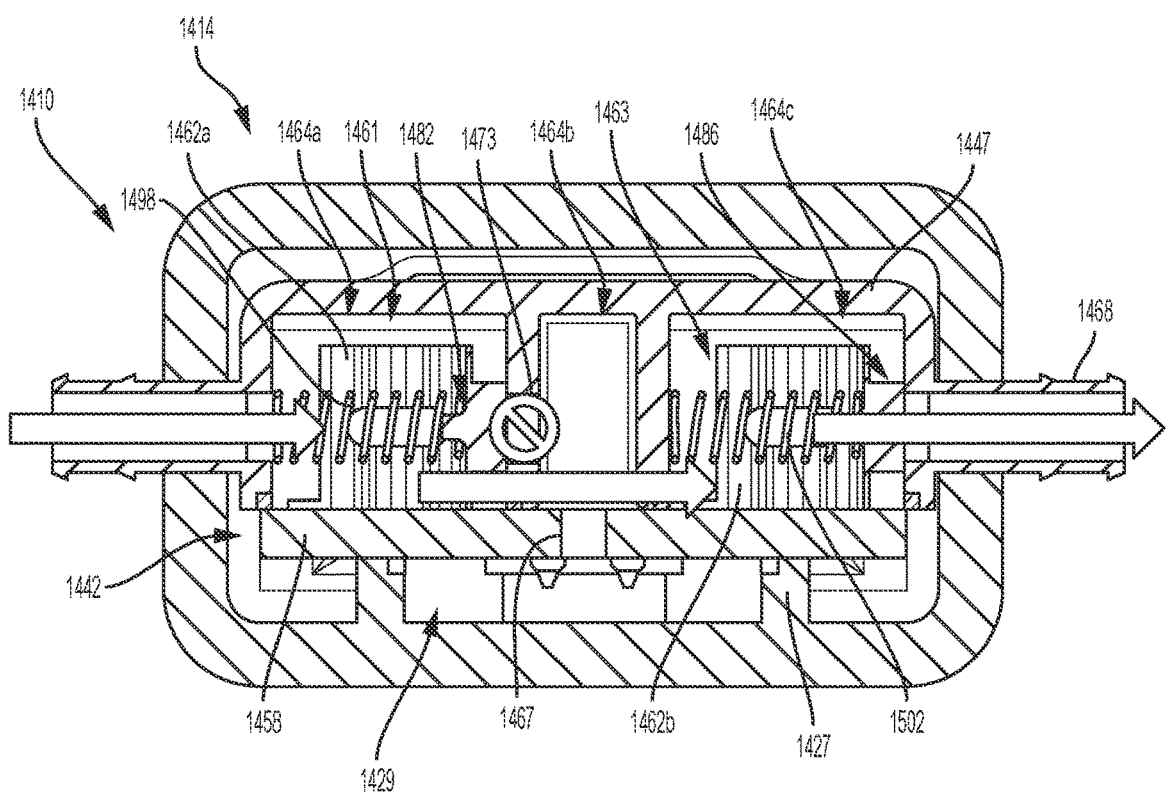
FIG. 24 is a cross-sectional view of the fluid management system of FIG. 21 illustrated in a deflating configuration.

With reference to FIG. 24, to switch to the deflating configuration, the PCB 1458 routes electrical current through the vent valve actuator 1462b associated with a selected vent valve 1463. As the actuator 1462b heats up, it contracts and moves the second piston 1486 away from the associated vent port 1468. This allows air from the vessel to flow into the first chamber 1464a, through the bypass channel 1477, into the third chamber 1464c, and out to the surrounding environment through the vent port 1468, thereby deflating the vessel.

Figure 25:
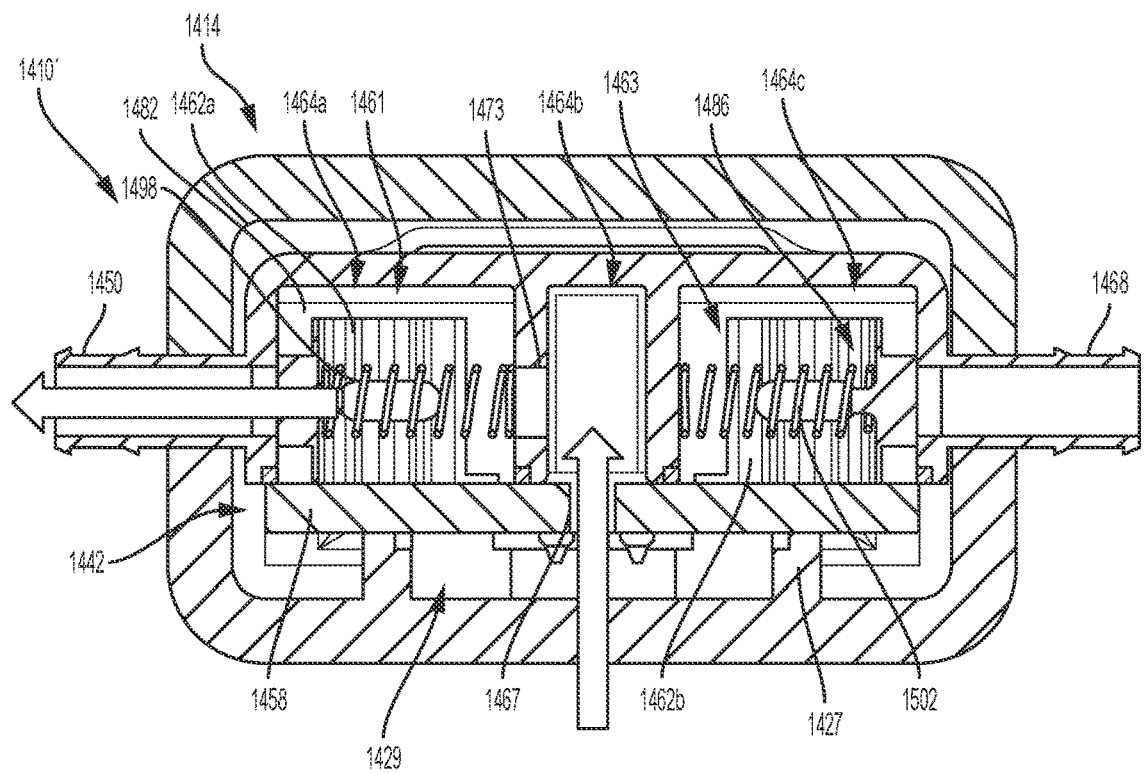
FIG. 25 is a cross-sectional view of a fluid management system according to another embodiment of the disclosure, illustrated in an inflating configuration.
Figure 26:
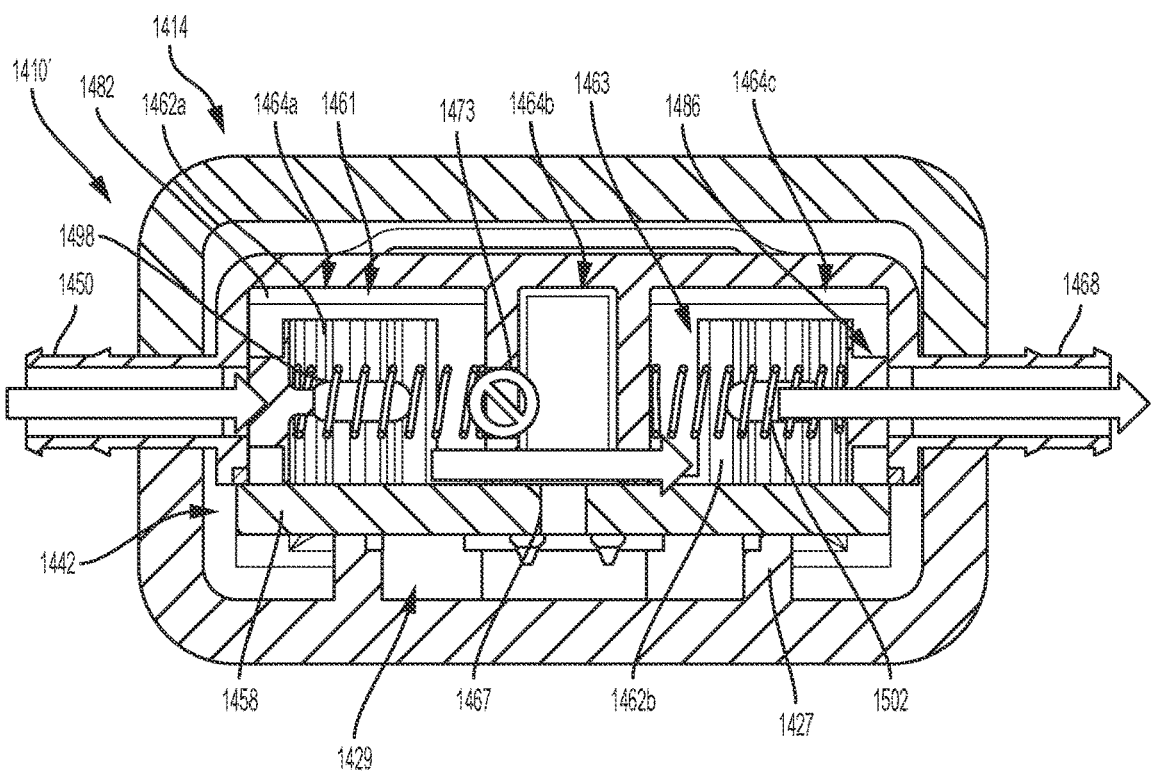
FIG. 26 is a cross-sectional view of the fluid management system of FIG. 25 in a deflating configuration.

FIGS. 25-26 illustrate a fluid management system 1410' according to another embodiment. The fluid management system 1410' is similar to the fluid management system 1410 of FIGS. 21-24. Features and elements of the system 1410' corresponding with features and elements of the fluid management system 1410 are given identical reference numbers. In addition, the following description focuses primarily on differences between the system 1410' and the system 1410.

In the fluid management system 1410', the orientation of the first piston 1482 within the first chamber 1464a is reversed. That is, the first piston 1482 is configured to selectively open and close the container connection port 1450, and the pressure port 1473 remains open. Thus, in the inflating configuration, illustrated in FIG. 25, the first piston 1482 moves to its open position, allowing pressurized fluid to flow from the intake manifold 1429, through the intake port 1467 and into the second chamber 1464b, then through the pressure port 1473 and into the first chamber 1464a, and finally through the container connection port 1450 and into the vessel. In the deflating configuration, illustrated in FIG. 26, both the first and second pistons 1482, 1486 are moved to their open positions, establishing a fluid flow path from the container connection port 1450 to the vent port 1468 via the bypass channel 1477 (FIG. 22). In some embodiments, the source of pressurized fluid may be turned off when the fluid management system 1410' is moved to the deflating configuration to stop the supply of pressurized fluid into the intake manifold 1429.

Figure 27:
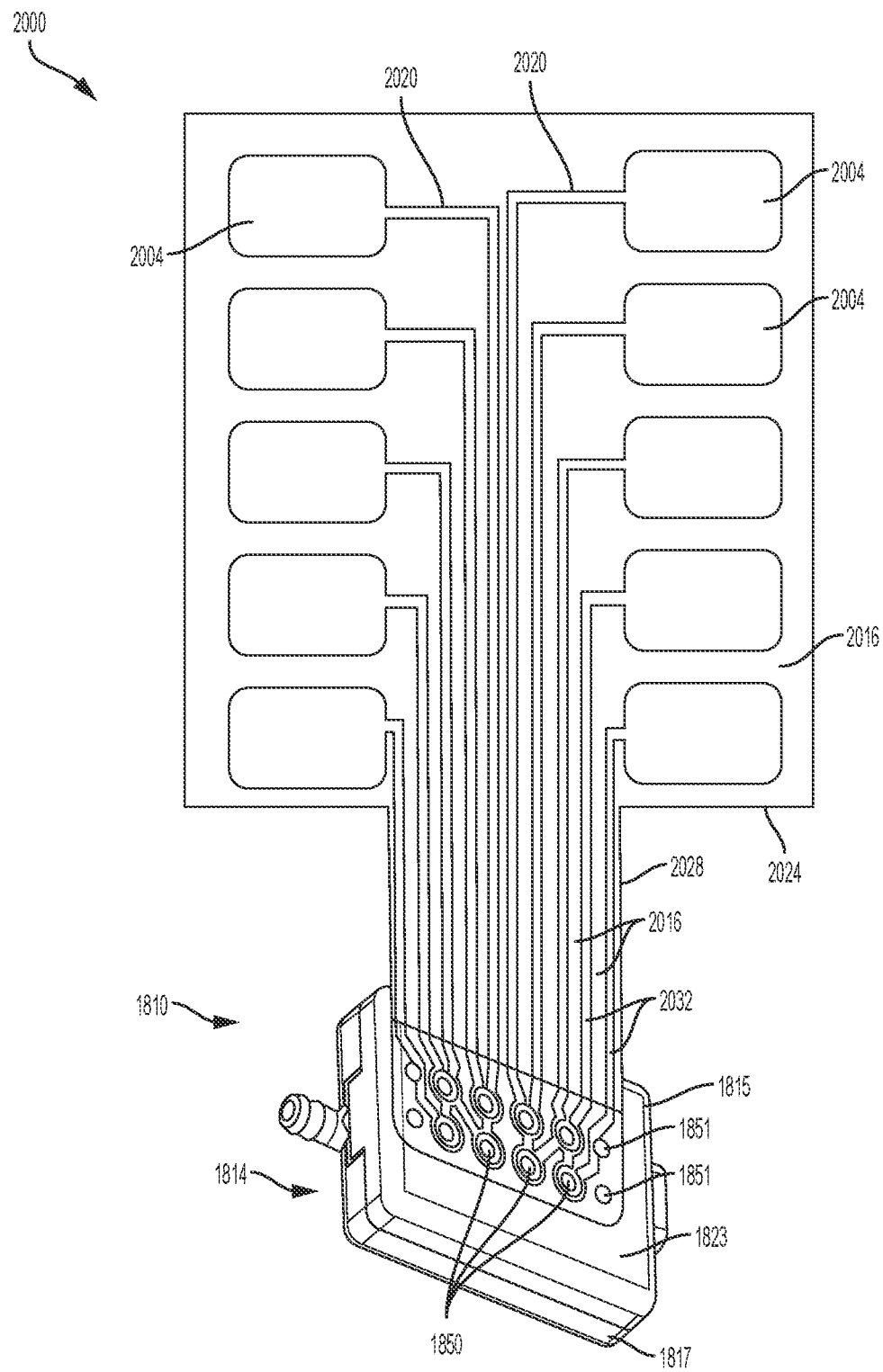
FIG. 27 is a perspective view illustrating a fluid management system according to another embodiment of the disclosure.

FIG. 27 illustrates a fluid management system 1810. The fluid management system 1810 may be, for example, any of the fluid management systems described and illustrated herein. In the illustrated embodiment, the fluid management system includes a housing 1814 having an upper portion 1815 and a lower portion 1817 coupled to the upper portion 1815. The upper portion 1815 includes a top wall 1823. The top wall 1823 includes a plurality of container connection ports 1850 extending through the top wall 1823 and communicating with respective valve assemblies (not shown) contained within the housing 1814. In the illustrated embodiment, a plurality of locator projections 1851 is disposed on opposite sides of the plurality of container connection ports 1850.

Figure 33:
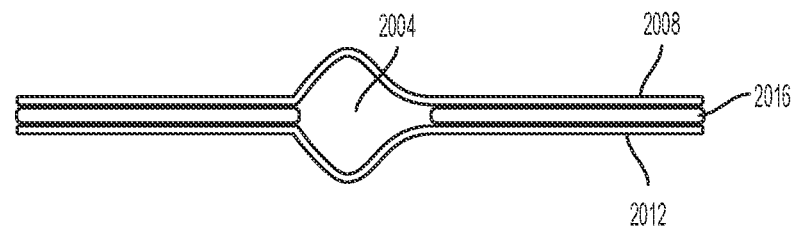
FIG. 33 is a schematic cross-sectional view illustrating an exemplary bladder formed from two layers of material.

The fluid management system 1810 includes a bladder assembly 2000 with a plurality of vessels or bladder chambers 2004 formed between a first or top sheet 2008 and a second or bottom sheet 2012 of weldable plastic material (FIG. 33). More specifically, the two sheets 2008, 2012 of material are bonded together by welding the two sheets 2008, 2012 to form welded areas 2016 (e.g., via a hot plate welding, laser welding, ultrasonic welding, or another suitable plastic welding process). The bladder chambers 2004 are unwelded, such that the two sheets 2008, 2012 may be separated at the bladder chambers 2004 (e.g., when the bladder chambers 2004 are filled with a pressurized fluid). Thus, the welded areas 2016 surround and define the perimeters of the bladder chambers 2004.

Referring to FIG. 27, the illustrated bladder assembly 2000 further includes a plurality of first conduits 2020 formed between the two sheets 2006, 2012. Each of the first conduits 2020 extends from a respective bladder chamber 2004 to an edge 2024 of the sheets 2008, 2012. The first conduits 2020 are in fluid communication with the interiors of the bladder chambers 2004 to allow fluid to flow into and out of the bladder chambers 2004 via the first conduits 2020. Like the bladder chambers 2004, the first conduits 2020 are preferably formed by welded areas 2016 on either side of each respective conduit 2020, such that the welded areas 2016 define the perimeters of the first conduits 2020.

Figure 28:
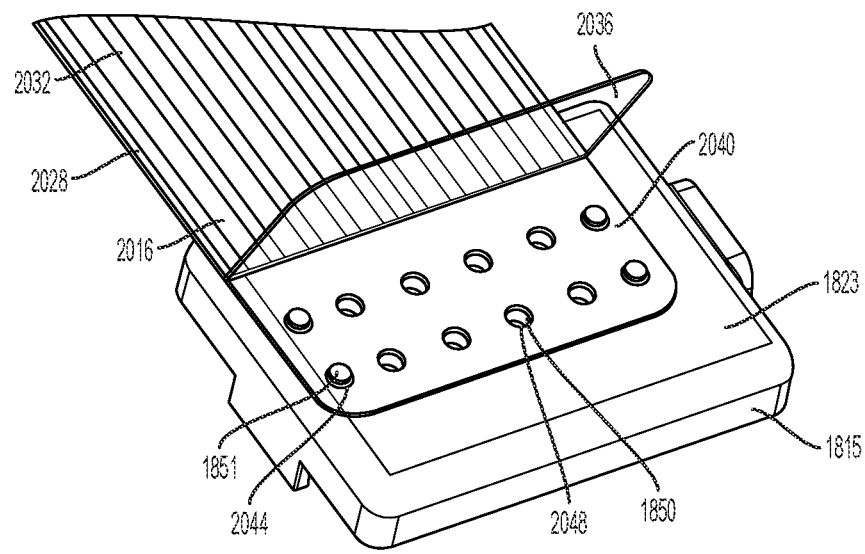
FIGS. 28-32 are perspective views illustrating a method of forming the fluid management system of FIG. 27.
Figure 29:
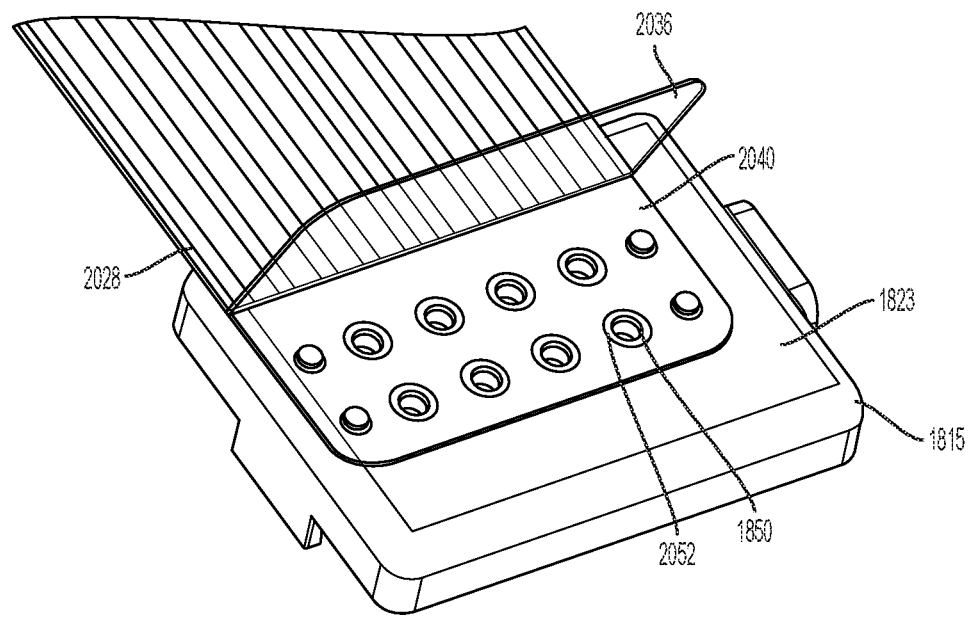

The bladder assembly 2000 further includes a tail 2028 extending from the edge 2024 of the sheets 2008, 2012. A plurality of second conduits 2032 extends through the tail 2028. Each of the second conduits 2032 is connected to a respective one of the first conduits 2020, such that the second conduits 2032 form extensions of the first conduits 2020. In some embodiments, the tail 2028 may be formed from a third or top sheet of material 2036 and fourth or bottom sheet of material 2040 (FIG. 28). In some embodiments, the top and bottom sheets 2036, 2040 of the tail 2028 may be formed separately and attached to the top and bottom sheets 2008, 2012, respectively, at the edge 2024 via a welding process. In other embodiments, the sheets 2036, 2040 that make up the tail 2028 may be integral parts of the sheets 2008, 2012. In such embodiments, material from the first and second sheets 2008, 2012 may be trimmed away to form the tail 20208. Furthermore, in such embodiments, the plurality of second conduits 2032 may extend continuously from the first conduits 2020 without any joints.

FIGS. 28-34 illustrate a method of forming the fluid management system 1810, and more specifically, a method of attaching the bladder assembly 2000 to the housing 1814 of the fluid management system 1810 such that the container connection ports 1850 communicate with the bladder chambers 2004 of the bladder assembly 2000.

With reference to FIG. 28, the bottom sheet 2040 of the tail 2028 includes a plurality of alignment openings 2044 and a plurality of port openings 2048. The tail 2028 is positioned relative to the upper portion 1815 of the housing 1814 by inserting the locator projections 1851 into the alignment openings 2044. When the locator projections 1851 are received within the alignment openings 2044, the port openings 2048 align with the container connection ports 1850.

Next, with the tail 2028 positioned relative to the upper portion 1815 of the housing 1814, the bottom sheet 2040 of the tail 2028 is then welded to the top wall 1823, preferably via a laser welding process. (FIG. 29) The top sheet 2036 of the tail 2028 is lifted away from the bottom sheet 2040 of the tail 2028 during this process to provide access to the bottom sheet 2040. In the illustrated embodiment, annular welded areas 2052 are formed surrounding the outer periphery of each of the container connection ports 1850. This creates a substantially air-tight seal around each of the container connection ports 1850.

Figure 30:
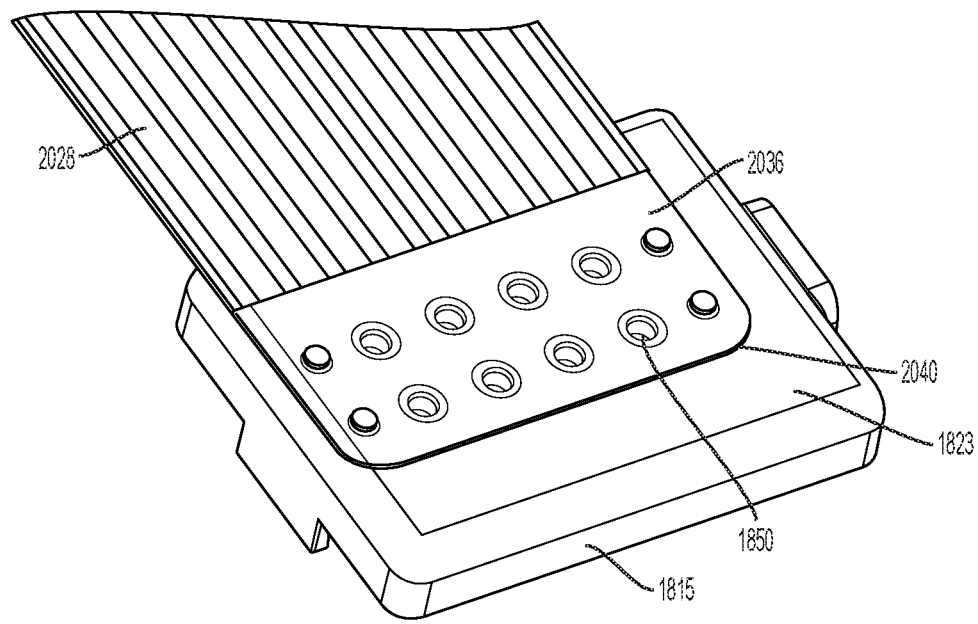
Figure 31:
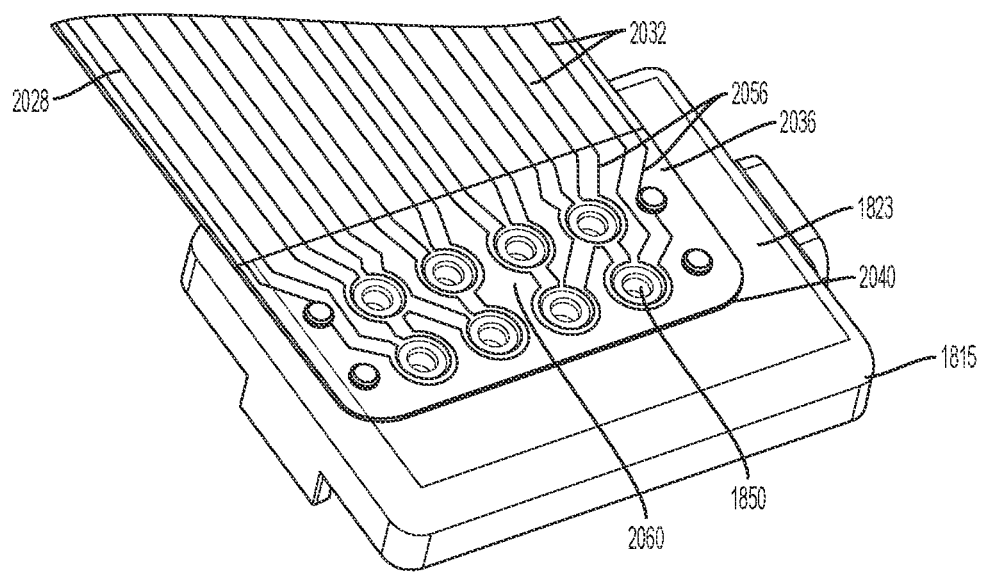
Figure 32:
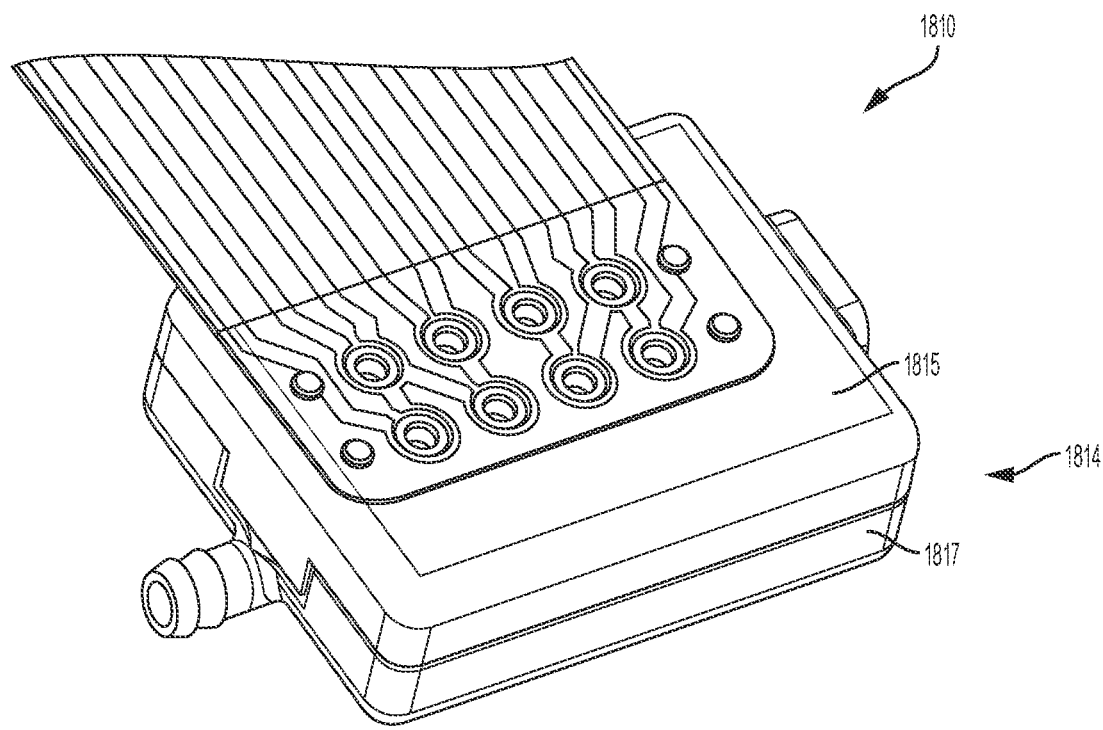

Once the bottom sheet 2040 is welded to the top wall 1823, the top sheet 2036 of the tail 2028 is lowered into position over the bottom sheet 2040. (FIG. 30). Next, a plurality of third conduits 2056 is formed by welding (e.g., laser welding) the top sheet 2036 of the tail 2028 to the bottom sheet 2040. (FIG. 31). The boundaries of the third conduits 2056 are defined by welded areas 2060 between the conduits 2056. The third conduits 2056 extend between the second conduits 2032 and the container connection ports 1850. As such, the third conduits 2056 complete the respective fluid flow paths from the container connection ports 1850 to the bladder chambers 2004. Finally, the upper portion 1815 of the housing 1814 is coupled to the lower portion 1817 to complete assembly of the fluid management system 1810.

Thus, the present disclosure provides various embodiments of fluid management systems that allow for a significant reduction in mass when compared to conventional fluid management systems (such as solenoid valve systems). The fluid management systems disclosed herein advantageously provide a reduced packaging footprint and an increased flexibility in design due to the ability to use one or more valve systems at the same time. Further, the use of an actuator including a smart material such as a shape memory alloy material may reduce the number of components compared to conventional fluid management systems and thereby greatly reduce time required to assembly the fluid management systems according to embodiments of the present disclosure. Finally, the fluid management systems described and illustrated herein may have additional advantages, including but not limited to improved electromagnetic compatibility (e.g., reduced electromagnetic emissions, particularly compared to typical solenoid valve systems), and quieter operation that conventional fluid management systems.

Although the disclosure has been described in detail with reference to certain preferred embodiments, variations and modifications exist within the scope and spirit of one or more independent aspects of the disclosure as described.

Various features of the disclosure are set forth in the following claims:

The invention claimed is:

1. A fluid management system comprising:
a housing including
a central manifold in fluid communication with a source of pressurized fluid,
a plurality of first ports in communication with the central manifold,
a plurality of second ports in communication with the environment surrounding the housing, and
a plurality of third ports each configured to be coupled to a vessel for containing the pressurized fluid;
a plurality of first valves each positioned and configured to close an associated one of the plurality of first ports in a first position and to permit fluid flow through the associated first port in a second position;
a plurality of second valves each positioned and configured to close an associated one of the plurality of second ports in a first position and to permit fluid flow through the associated second port in a second position;

a plurality of first actuators each including a smart material and each associated with one of the plurality of first valves;
a plurality of second actuators each including a smart material and each associated with one of the plurality of second valves;
an energy source operatively associated with each of the first actuators and each of the second actuators, wherein the energy source is configured to selectively operate each of the first actuators and each of the second actuators,
wherein in response to activation by the energy source, each first actuator is configured to move the associated first valve to one of the first position or the second position, and
wherein in response to activation by the energy source, each second actuator is configured to move the associated second valve to one of the first position or the second position.

2. The fluid management system of claim 1, wherein in response to activation by the energy source, each first actuator moves the associated first valve from the first position to the second position to open the associated first port, and wherein in response to activation by the energy source, each second actuator moves the associated second valve from the first position to the second position to open the associated second port.

3. The fluid management system of claim 1, further comprising a plurality of biasing elements each coupled to an associated one of the plurality of first valves, each biasing element configured to bias the associated first valve toward one of the first position or the second position.

4. The fluid management system of claim 1, wherein each first valve is associated with one of the plurality of second valves, and wherein each of the associated first and second valves is movable independently of one another.

5. The fluid management system of claim 1, wherein the smart material is a shape memory alloy material.

6. A fluid management system comprising:
a housing including
a manifold chamber in fluid communication with a source of pressurized fluid, wherein the manifold chamber is partially defined by a PCB, and
a plurality of ports in fluid communication with the manifold chamber, wherein each port is configured to receive pressurized fluid from the manifold chamber; and
a plurality of valves each positioned and configured to close an associated one of the plurality of ports in a first position and to permit pressurized fluid flow through the associated port in a second position,
wherein the PCB is positioned between the manifold chamber and the plurality of ports,
wherein the PCB includes a plurality of apertures, and
wherein each aperture is in fluid communication with the manifold chamber and in fluid communication with an associated one of the plurality of ports.

7. The fluid management system of claim 6, further comprising a plurality of actuators each associated with one of the plurality valves, wherein each actuator includes a shape memory alloy material, and wherein in response to heating, each actuator is configured to move the associated valve to one of the first position or the second position.

8. The fluid management system of claim 6, wherein the housing has a longitudinal axis extending centrally along a length of the housing, and wherein the manifold chamber extends along the longitudinal axis.

9. The fluid management system of claim 6,
wherein the plurality of ports is a plurality of first ports, the plurality of valves is a plurality of first valves, and the plurality of apertures is a plurality of first apertures,
wherein the housing further includes:
a vent chamber positioned between the manifold chamber and a first external wall of the housing, wherein the vent chamber is in fluid communication with an environment surrounding the housing and is partially defined by the PCB,
a plurality of second ports, each second port associated with one of the plurality of first ports and in fluid communication with the vent chamber, and
a plurality of third ports in fluid communication with a vessel for containing the pressurized fluid, each third port in fluid communication with an associated one of the plurality of first ports and in fluid communication with an associated one of the plurality of second ports,
wherein the fluid management system further comprises a plurality of second valves, each second valve positioned and configured to close an associated one of the plurality of second ports in a first position and to permit fluid flow through the associated second port in a second position,
wherein the PCB is positioned between the vent chamber and the plurality of second ports, and
wherein the PCB includes a plurality of second apertures, each second aperture in fluid communication with the vent chamber and an associated one of the plurality of second ports.

10. The fluid management system of claim 9,
wherein the vent chamber is a first vent chamber,
wherein the first plurality of ports, the second plurality of ports, the third plurality of ports and the first vent chamber are positioned along a first side of the manifold chamber,
wherein the housing further includes:
a second vent chamber positioned along a second side of the manifold chamber opposite the first side, wherein the second vent chamber is in fluid communication with an environment surrounding the housing and is partially defined by the PCB,
a plurality of fourth ports in fluid communication with the manifold chamber and positioned along the second side of the manifold chamber, each fourth port configured to receive pressurized fluid from the manifold chamber,
a plurality of fifth ports positioned along the second side of the manifold chamber, each fifth port associated with one of the plurality of fourth ports and in fluid communication with the second vent chamber, and
a plurality of sixth ports each in fluid communication with a vessel for containing the pressurized fluid, each sixth port positioned along the second side of the manifold chamber and in fluid communication with an associated one of the plurality of fourth ports and in fluid communication with an associated one of the plurality of fifth ports, and
wherein the fluid management system further comprises:
a plurality of third valves, each third valve positioned and configured to close an associated one of the plurality of fourth ports in a first position and to permit pressurized fluid flow through the associated fourth port in a second position, and a plurality of fourth valves, each fourth valve positioned and configured to close an associated one of the plurality of fifth ports in a first position and to permit fluid flow through the associated fifth port in a second position, wherein the PCB is positioned between the second manifold chamber and the plurality of fourth ports, wherein the PCB includes a plurality of third apertures and each third is in fluid communication with the manifold chamber and an associated one of the plurality of fourth ports, wherein the PCB is positioned between the vent chamber and the plurality of fifth ports, and wherein the PCB includes a plurality of fourth apertures and each fourth aperture is in fluid communication with the second vent chamber and an associated one of the plurality of fifth ports.

11. The fluid management system of claim 10,
wherein the housing has a longitudinal axis extending centrally along a length of the housing,
wherein the manifold chamber extends along the longitudinal axis between the first vent chamber and the second vent chamber,
wherein the plurality of first ports is spaced-apart along the longitudinal axis of the housing parallel to the manifold chamber, and
wherein the plurality of fourth ports is spaced-apart along the longitudinal axis parallel to the manifold chamber.

12. The fluid management system of claim 10, further comprising a plurality of first actuators and a plurality of second actuators,
wherein each first actuator is associated with one of the plurality of first valves and includes a smart material,
wherein each first actuator is configured to move the associated first valve to one of the first position or the second position,
wherein each second actuator is associated with one of the plurality of second valves and includes a smart material, and
wherein each second actuator is configured to move the associated second valve to one of the first position or the second position.

13. The fluid management system of claim 12, wherein the smart material is a shape memory alloy material.

14. A fluid management system comprising:
a housing including
an interior volume defined by a first wall, a PCB spaced apart from and opposite the first wall, and a pair of opposed spaced-apart second walls that extend between the first wall and the PCB,
a manifold chamber in fluid communication with a source of pressurized fluid, wherein the manifold chamber is positioned within the interior volume,
a plurality of first intake ports in fluid communication with the manifold chamber and positioned within the interior volume along a first side of the manifold chamber,
a plurality of second intake ports in fluid communication with the manifold chamber and positioned within the interior volume along a second side of the manifold chamber opposite the first side,
a plurality of first vent ports, each first vent port positioned within the interior volume and associated with one of the plurality of first intake ports and in fluid communication with a first vent chamber,
a plurality of second vent ports, each second vent port positioned within the interior volume and associated with one of the plurality of second intake ports and in fluid communication with a second vent chamber,
a plurality of first container ports each in fluid communication with a vessel for containing the pressurized fluid, each first container port in fluid communication with an associated one of the first plurality of intake ports and in fluid communication with an associated one of the first plurality of vent ports, and
a plurality of second container ports each in fluid communication with a vessel for containing the pressurized fluid, each second container port in fluid communication with an associated one of the second plurality of intake ports and in fluid communication with an associated second one of the second plurality of vent ports;
a plurality of first intake valves, each first intake valve positioned and configured to close an associated one of the plurality of first intake ports in a first position and to permit pressurized fluid flow from the manifold through the associated first intake port in a second position;
a plurality of second intake valves, each second intake valve positioned and configured to close an associated one of the plurality of second intake ports in a first position and to permit pressurized fluid flow from the manifold through the associated second intake port in a second position;
a plurality of first vent valves, each first vent valve positioned and configured to close an associated one of the plurality of first vent ports in a first position and to permit fluid flow through the associated first vent port in a second position; and
a plurality of second vent valves, each second vent valve positioned and configured to close an associated one of the second plurality of second vent ports in a first position and to permit fluid flow through the associated second vent port in a second position.

15. The fluid management system of claim 14, further comprising a plurality of intake actuators and a plurality of vent actuators,
wherein each intake actuator is associated with one of the plurality of first intake valves or with one of the plurality of second intake valves,
wherein each intake actuator includes a smart material and is configured to move the associated first intake valve or the associated second intake valve to one of the first position or the second position,
wherein each vent actuator is associated with one of the plurality of first vent valves or one of the plurality of second vent valves, and
wherein each vent actuator includes a smart material and is configured to move the associated first vent valve or the associated second vent valve to one of the first position or the second position.

16. The fluid management system of claim 14, wherein the housing has a longitudinal axis, and wherein the manifold chamber extends along the longitudinal axis between the first vent chamber and the second vent chamber.

17. The fluid management system of claim 16, wherein the plurality of first intake ports is positioned between the first side of the manifold chamber and the plurality of first vent ports and the plurality of second intake ports is positioned between the second side of the manifold chamber and the plurality of second vent ports.

18. The fluid management system of claim 16, wherein each of the plurality first intake ports and each of the plurality of second intake ports is spaced-apart along the longitudinal axis of the housing parallel to the manifold chamber and each of the plurality of first vent ports and each of the plurality of second vent ports is spaced-apart along the longitudinal axis parallel to the plurality of first intake ports and the plurality of second intake ports.

19. The fluid management system of claim 18, wherein each first intake port and each second intake port lies in a common plane and each first vent port and each second vent port lies in a common plane.

20. The fluid management system of claim 19, further comprising a plurality of intake actuators and a plurality of vent actuators,
- wherein each intake actuator is associated with one of the plurality of first intake valves or with one of the plurality of second intake valves,
- wherein each intake actuator includes a smart material and is configured to move the associated first intake valve or the associated second intake valve to one of the first position or the second position,
- wherein each vent actuator is associated with one of the plurality of first vent valves or one of the plurality of second vent valves, and
- wherein each vent actuator includes a smart material and is configured to move the associated first vent valve or the associated second vent valve to one of the first position or the second position.

* * * * *